United States Patent [19]

Dahlgren

[11] 4,122,772

[45] Oct. 31, 1978

[54] HYDROSTATIC BEARER FOR PRINTING PRESS

[76] Inventor: Harold P. Dahlgren, Dallas, Tex.

[21] Appl. No.: 495,979

[22] Filed: Aug. 9, 1974

Related U.S. Application Data

[63] Continuation of Ser. No. 207,499, Dec. 13, 1971, abandoned, which is a continuation-in-part of Ser. No. 737,521, Jun. 17, 1968, Pat. No. 3,664,261.

[51] Int. Cl.[2] .......... B41F 7/04; F16C 7/04

[52] U.S. Cl. .......... 101/218; 308/9

[58] Field of Search .......... 308/9; 101/218

[56] References Cited

U.S. PATENT DOCUMENTS

| | | | |
|---|---|---|---|
| 1,421,681 | 7/1922 | Fuegel et al. | 308/121 |
| 2,267,100 | 12/1941 | Huck | 101/137 |
| 2,539,072 | 1/1951 | Gordon et al. | 308/122 |
| 2,719,065 | 9/1955 | Hornbostel | 308/122 |
| 2,760,832 | 8/1956 | Bidwell | 308/9 |
| 2,778,303 | 1/1957 | Stempel | 101/218 |
| 3,112,695 | 12/1963 | Seel | 101/137 |
| 3,195,858 | 7/1965 | Schwarz | 415/175 |
| 3,351,394 | 11/1967 | Hooker | 308/9 |
| 3,453,031 | 7/1969 | Rickley et al. | 301/9 |
| 3,470,816 | 10/1969 | Piecha et al. | 101/218 |
| 3,610,146 | 10/1971 | Willmott | 101/216 |

*Primary Examiner*—Clyde I. Coughenour
*Attorney, Agent, or Firm*—Howard E. Moore; Gerald G. Crutsinger; Larry B. Dwight

[57] ABSTRACT

An internal hydrostatic bearer for printing presses wherein ends of cylinders of the press are rotatably journaled in hydrostatic bearers in side frames of the press. The bearer comprises a sleeve having an opening extending therethrough which is formed eccentric to the outer circumference of the sleeve. The opening is adapted for circulation of fluid therethrough around the periphery of the end of the cylinder.

1 Claim, 30 Drawing Figures

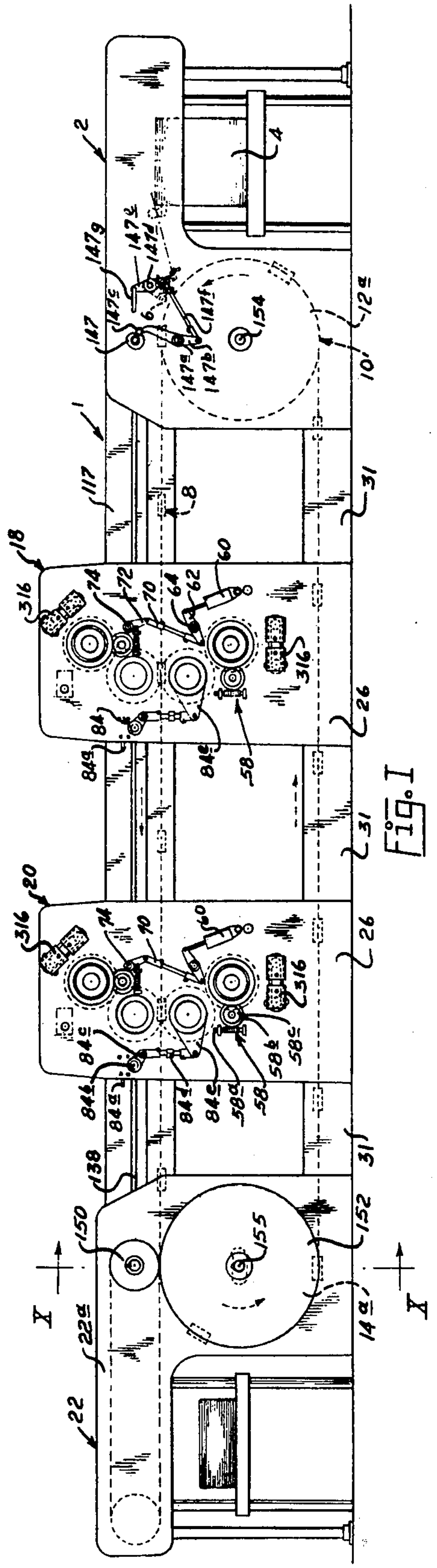
Fig. I
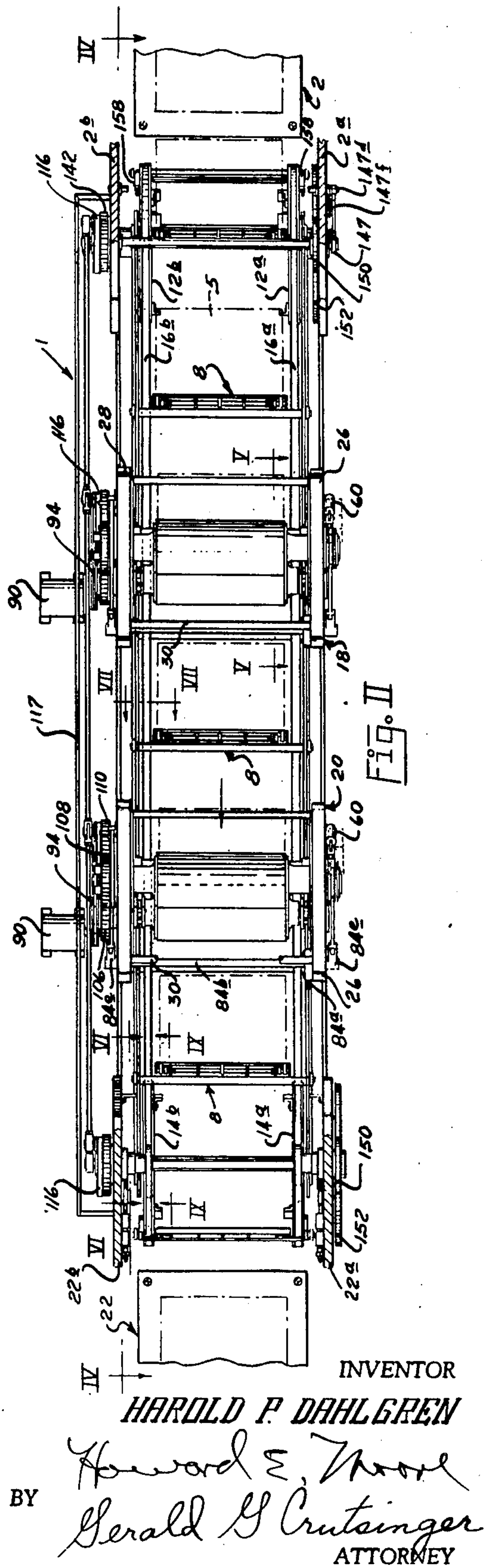
Fig. II
INVENTOR
HAROLD P. DAHLGREN
BY Howard E. Moore
Gerald G. Crutsinger
ATTORNEY

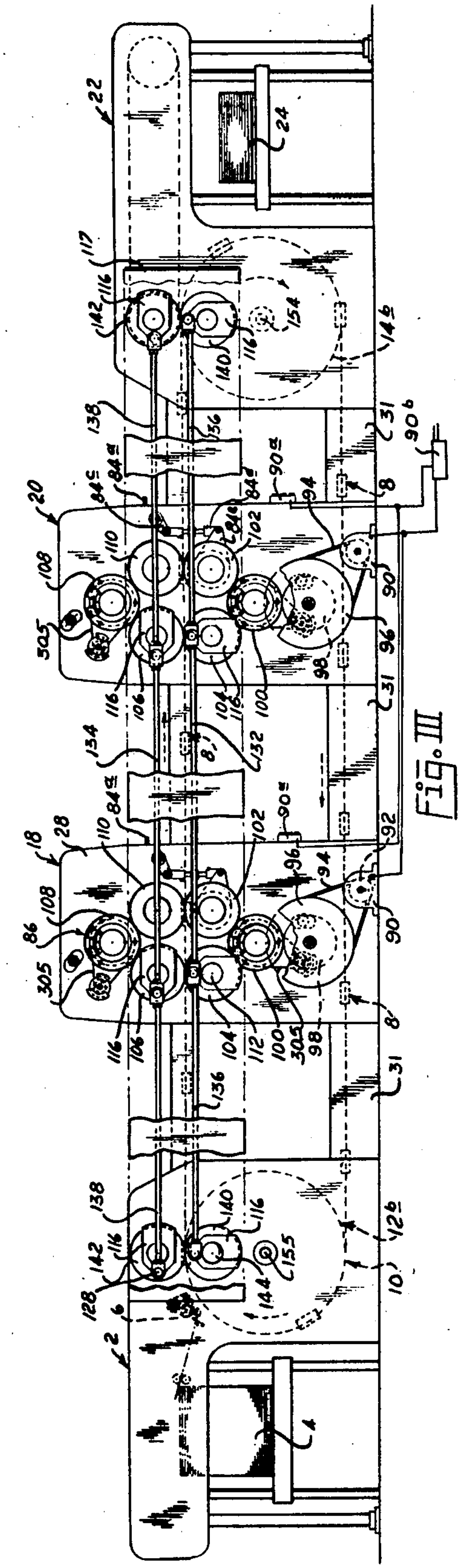
Fig. III
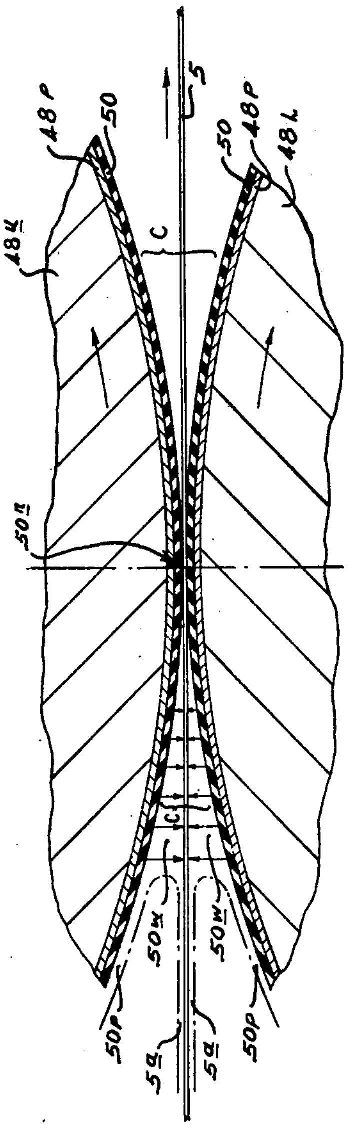
Fig. XX
INVENTOR
HAROLD P. DAHLGREN
BY Howard E. Moore
Gerald G Crutsinger
ATTORNEY

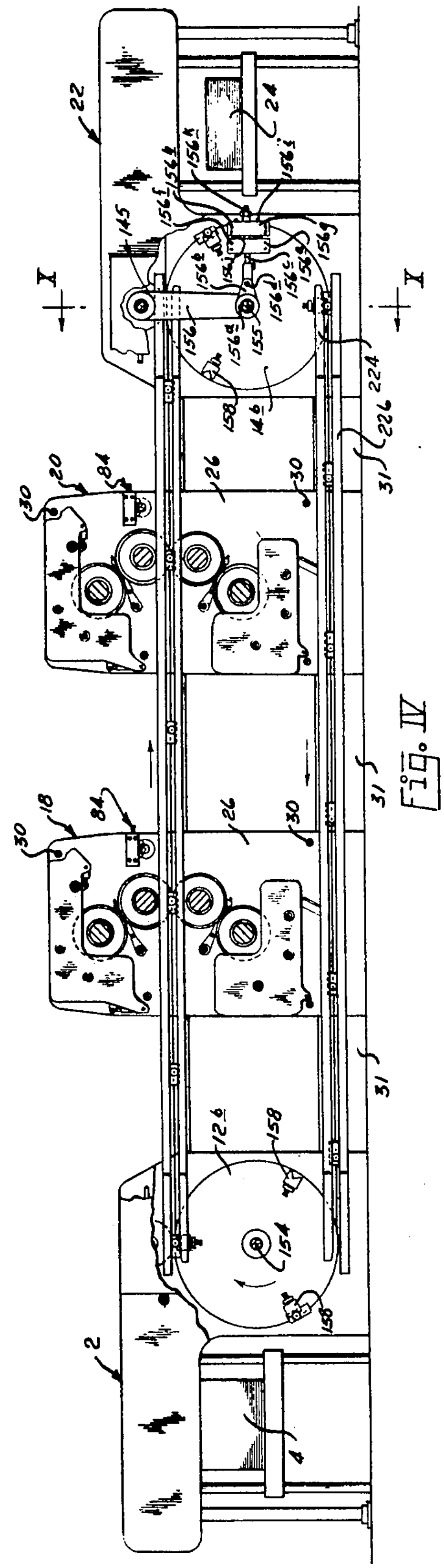
Fig. IV
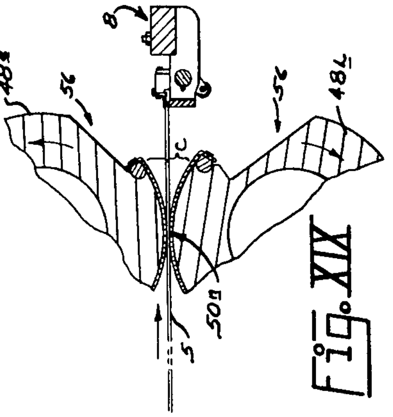
Fig. XIX
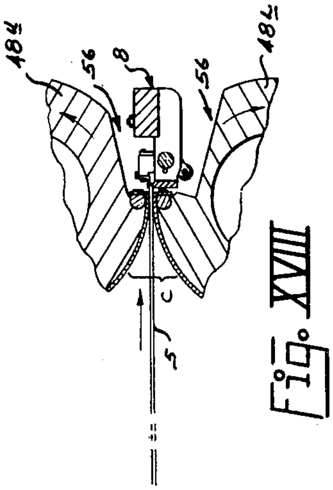
Fig. XVIII
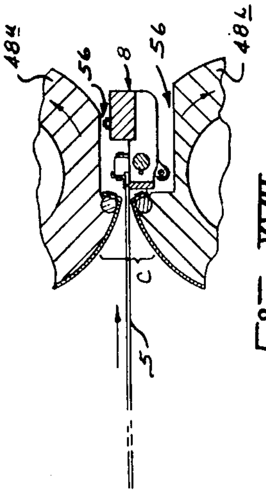
Fig. XVII
INVENTOR
HAROLD F. DAHLGREN
BY Howard E. Moore
Gerald G. Crutsinger
ATTORNEY

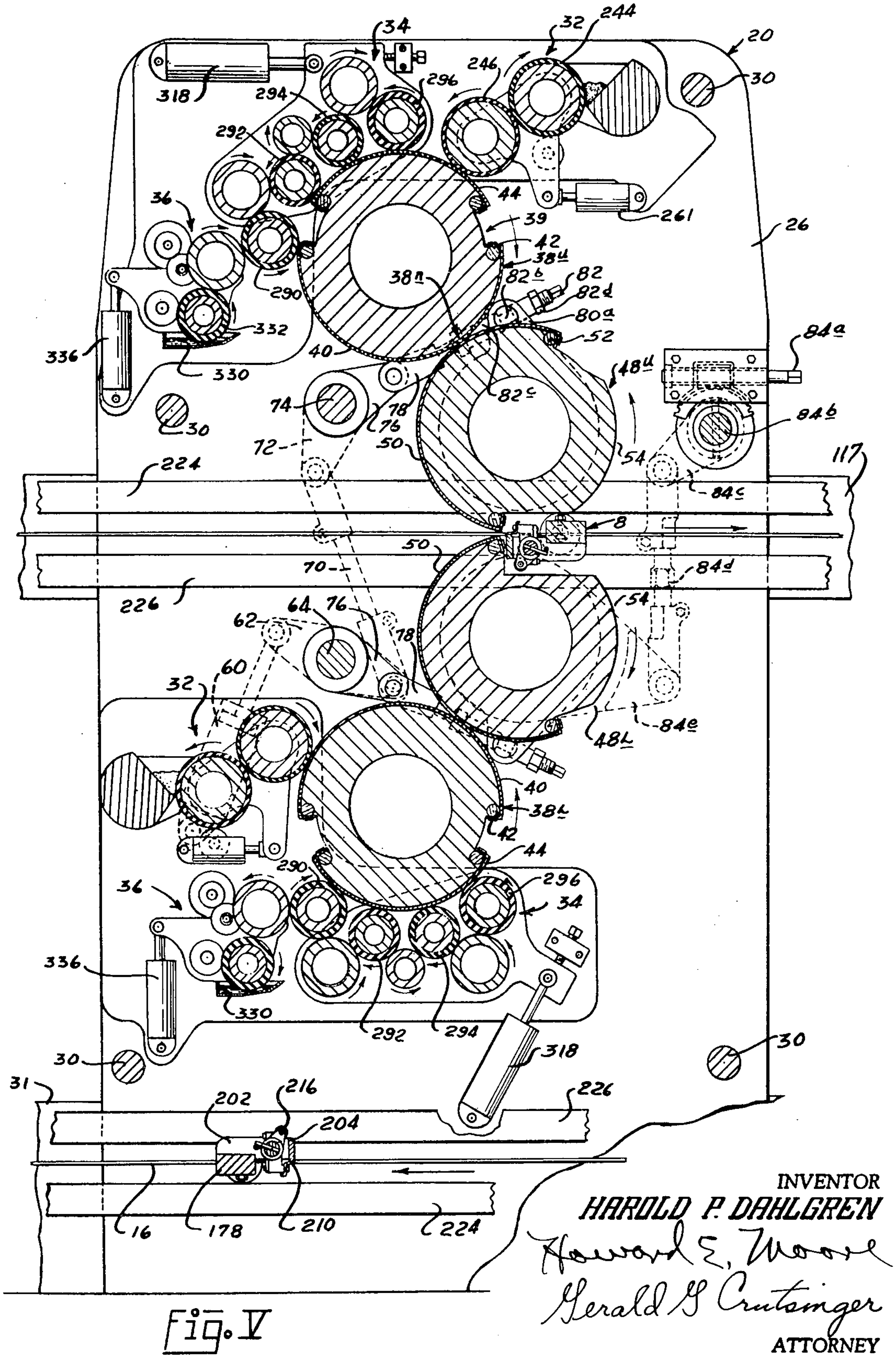
Fig. V
INVENTOR
HAROLD P. DAHLGREN
Howard E. Moore
Gerald G Crutsinger
ATTORNEY

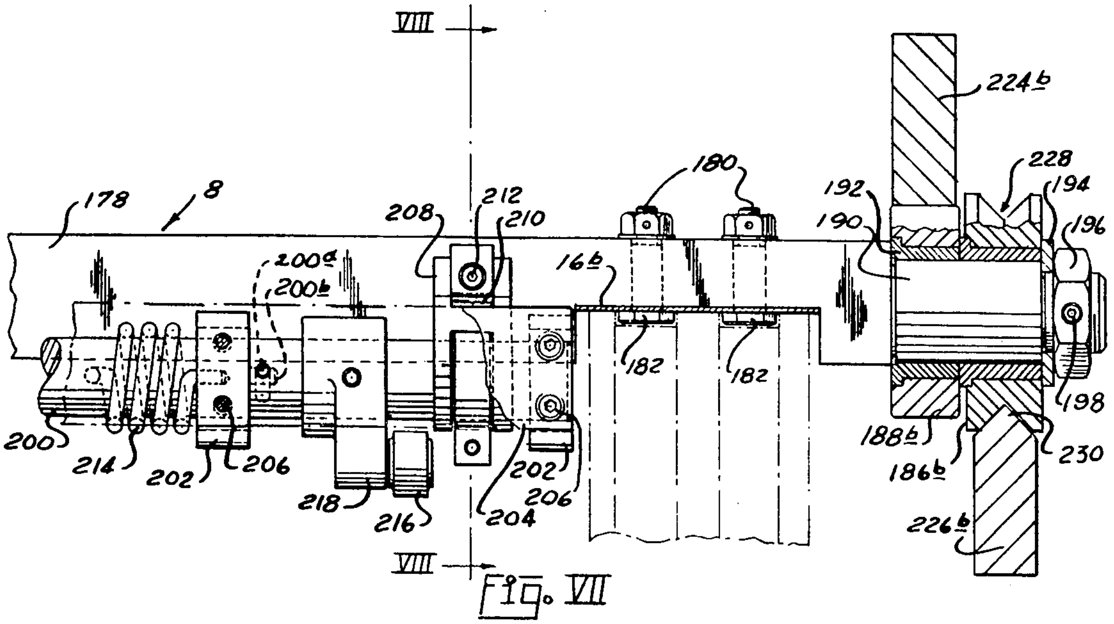
Fig. VII
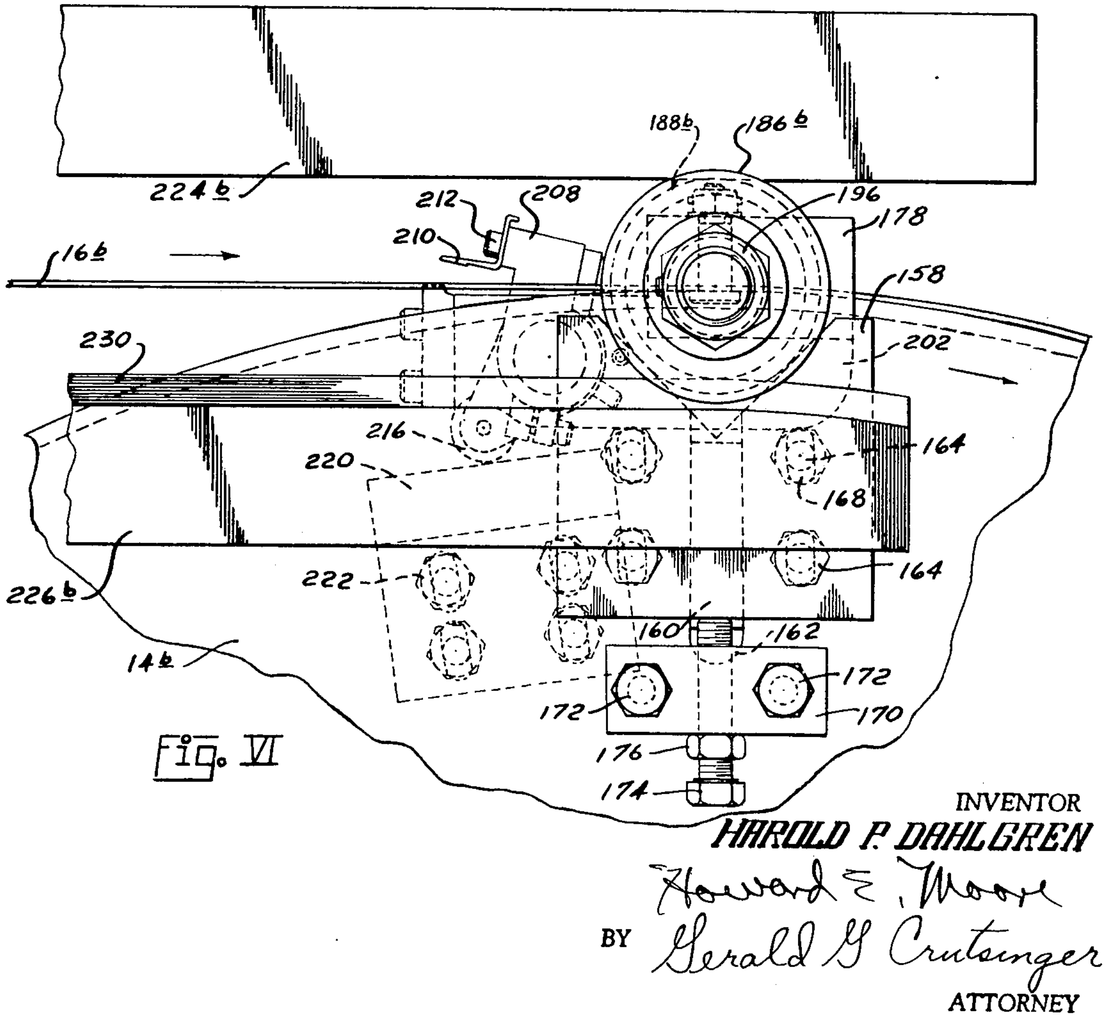
Fig. VI
INVENTOR
HAROLD P. DAHLGREN
Howard E. Moore
BY Gerald G Crutsinger
ATTORNEY

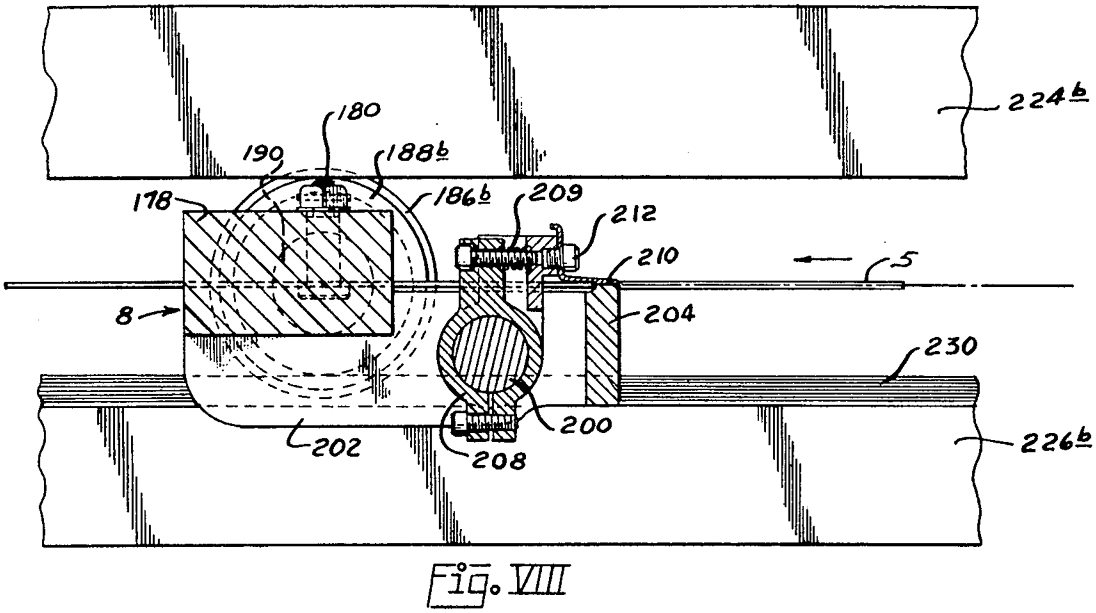
Fig. VIII
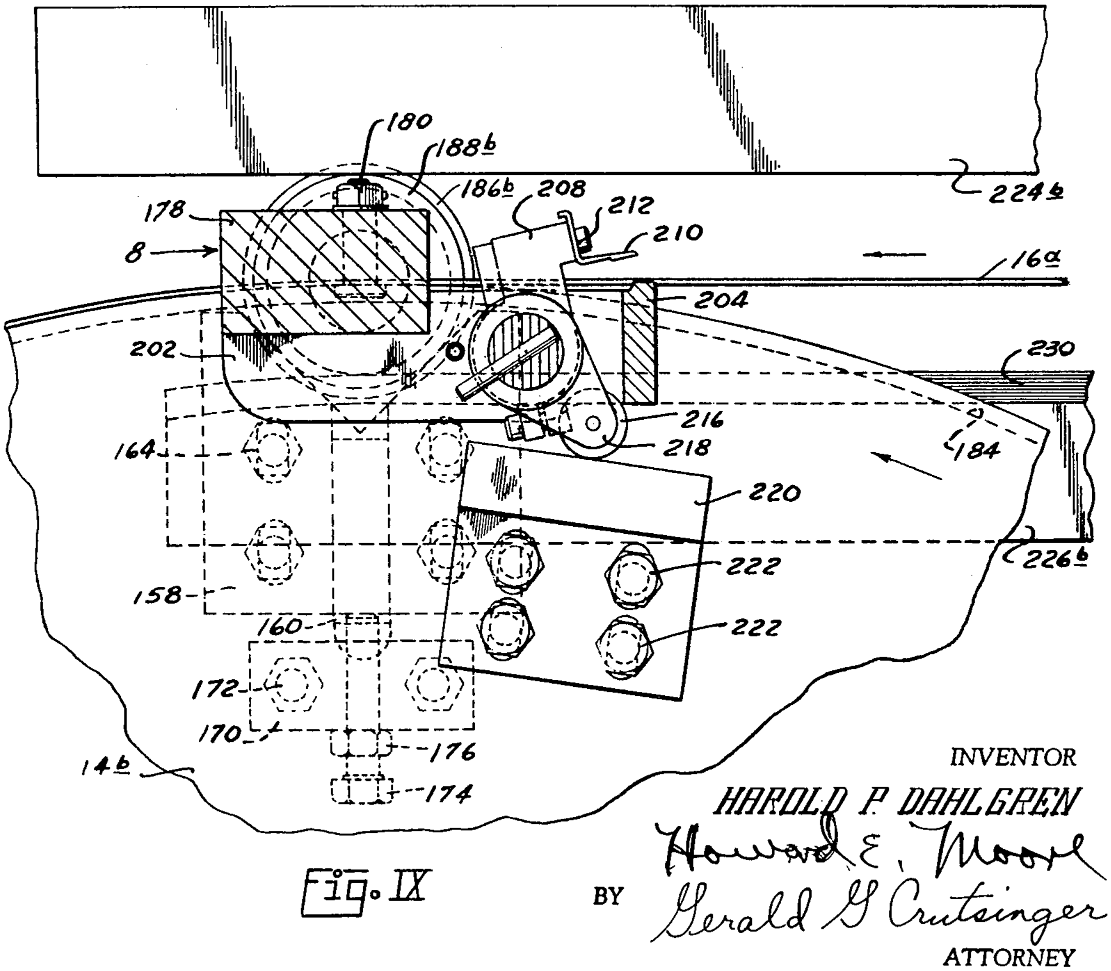
Fig. IX
INVENTOR
HAROLD P. DAHLGREN
Howard E. Moore
BY Gerald G Crutsinger
ATTORNEY

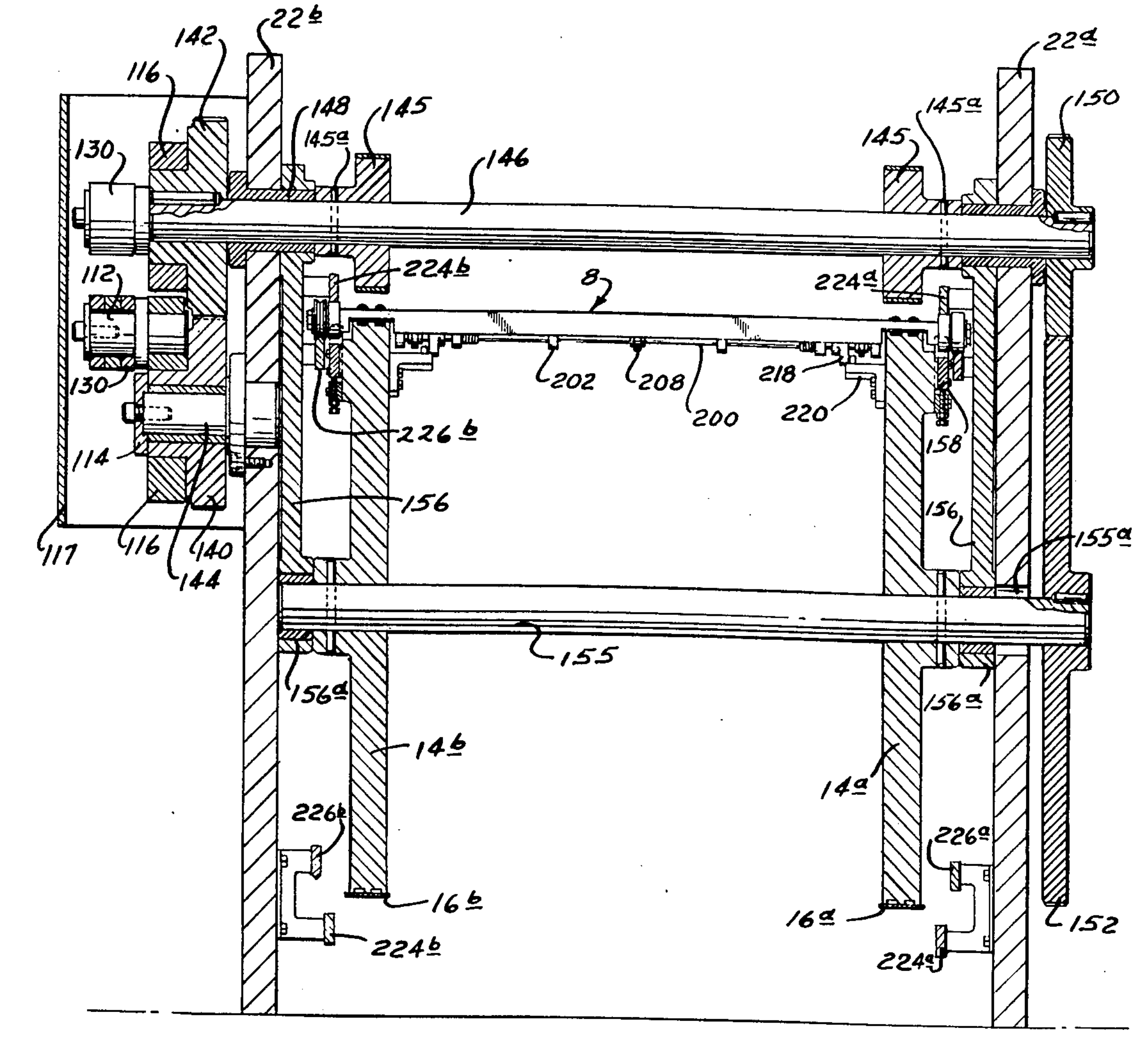
Fig. X
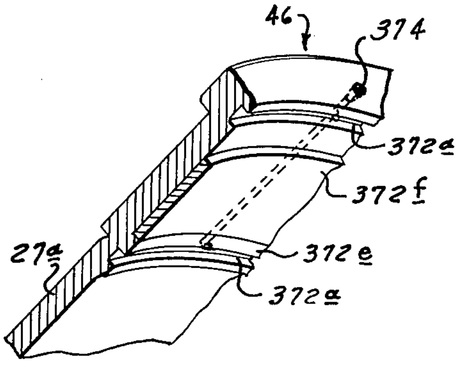
Fig. XXX
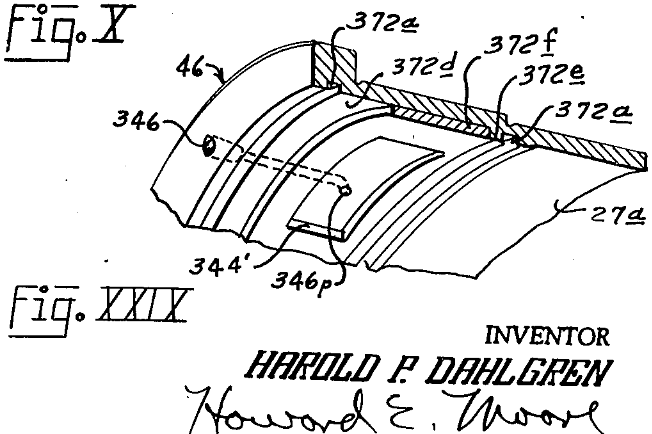
Fig. XXIX
INVENTOR
HAROLD P. DAHLGREN
Howard E. Moore
BY Gerald G Crutsinger
ATTORNEY

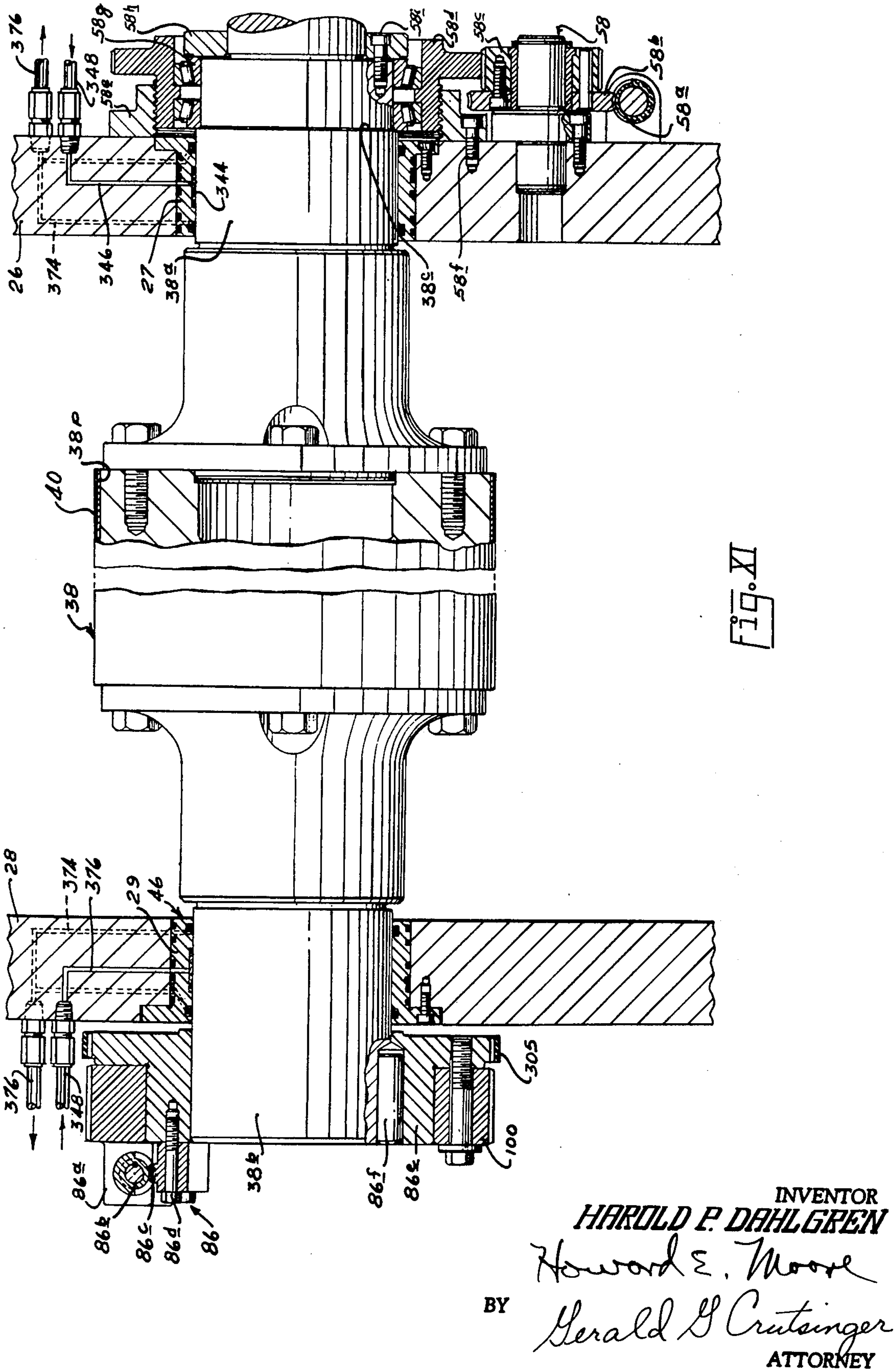
Fig. XI
INVENTOR
HAROLD P. DAHLGREN
Howard E. Moore
BY Gerald G Crutsinger
ATTORNEY

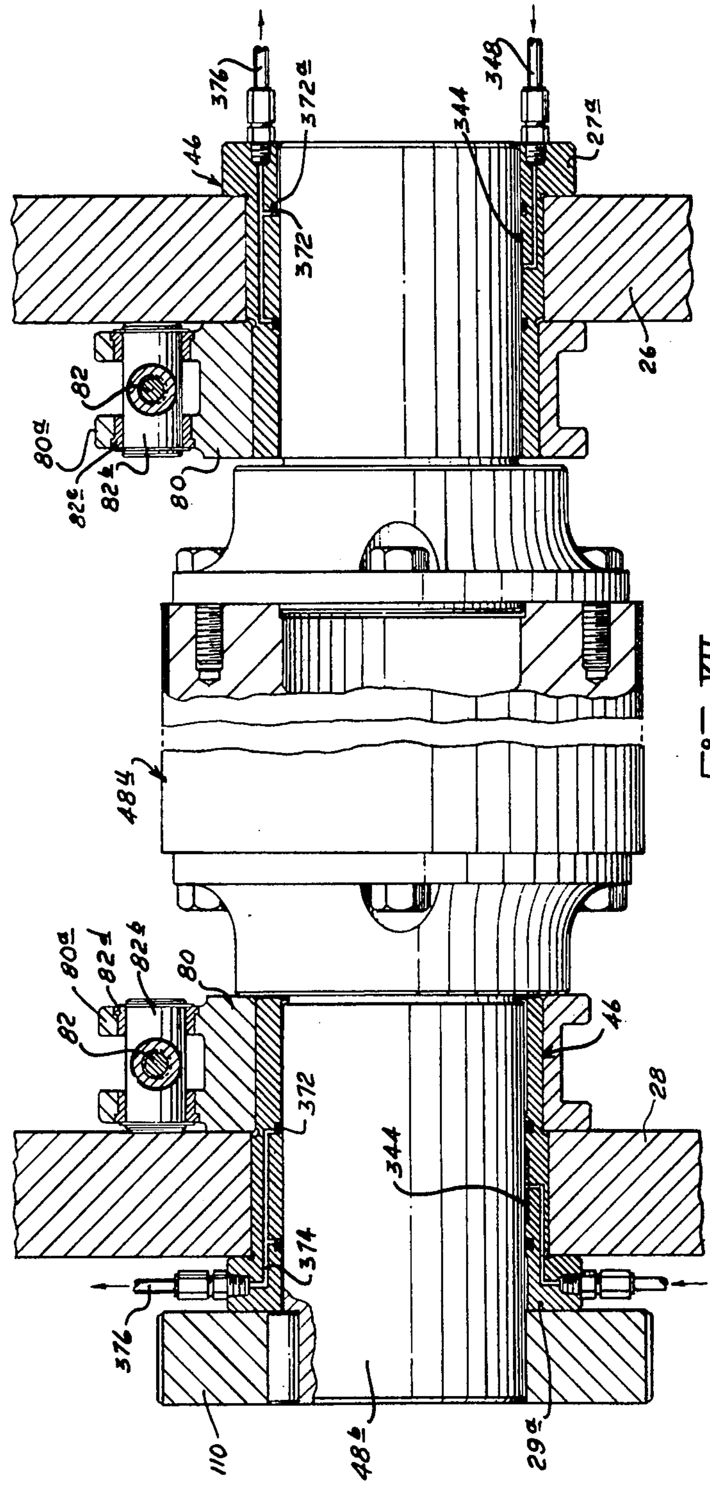
Fig. XII
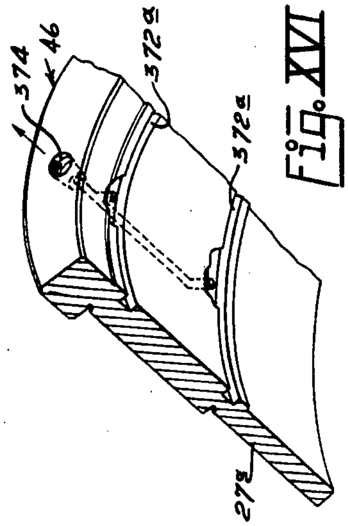
Fig. XVI
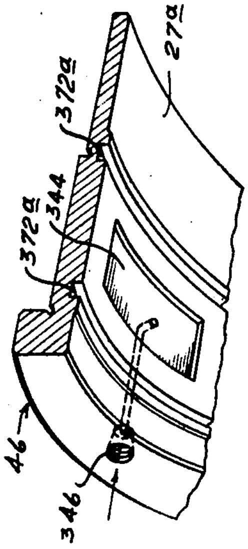
Fig. XV
INVENTOR
HAROLD P. DAHLGREN
Howard E. Moore
BY Gerald G. Crutsinger
ATTORNEY

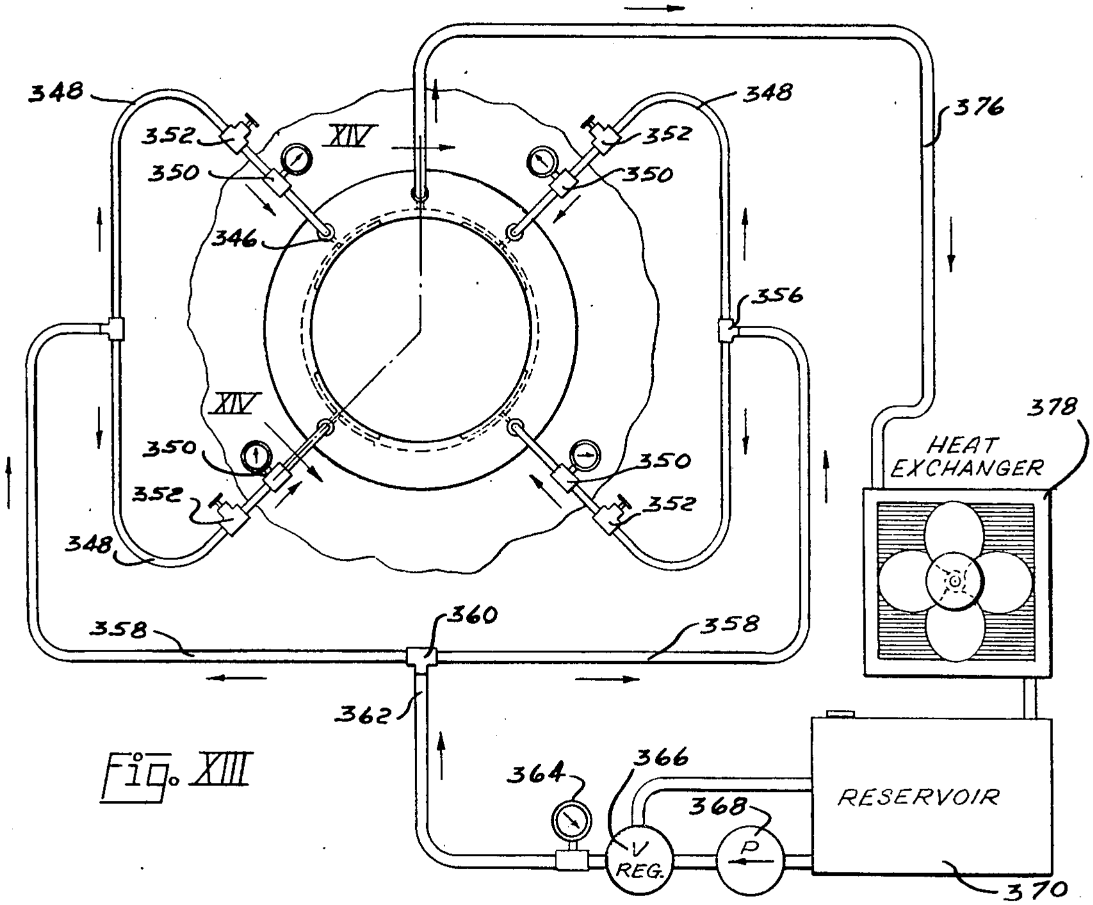
Fig. XIII
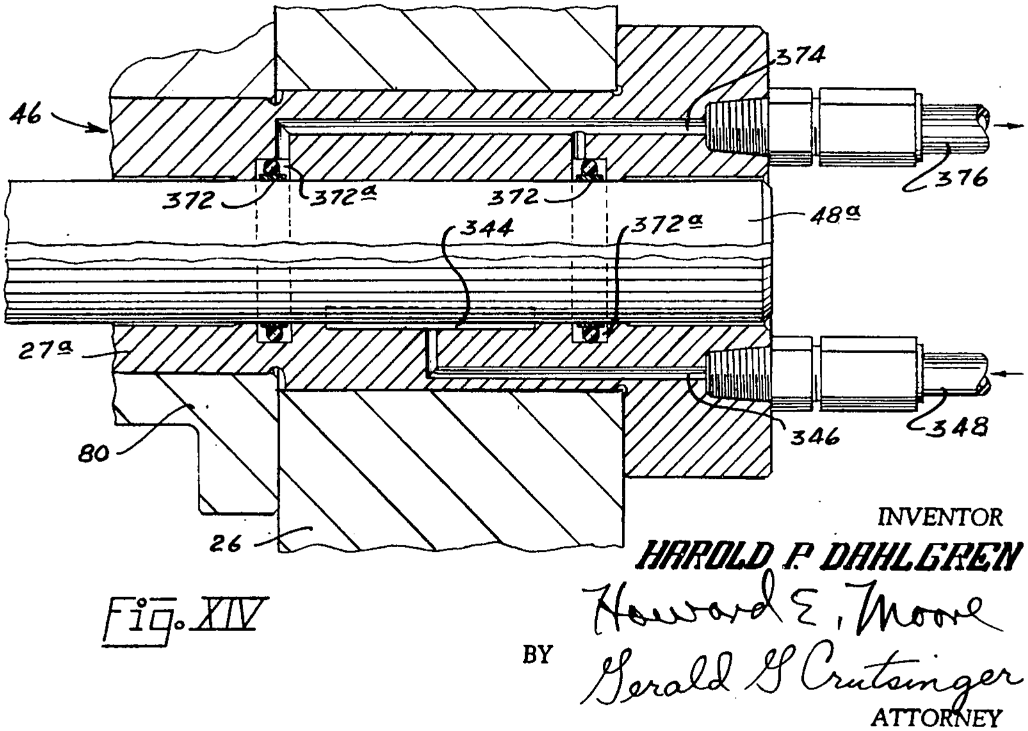
Fig. XIV
INVENTOR
HAROLD P. DAHLGREN
Howard E. Moore
BY Gerald G Crutsinger
ATTORNEY

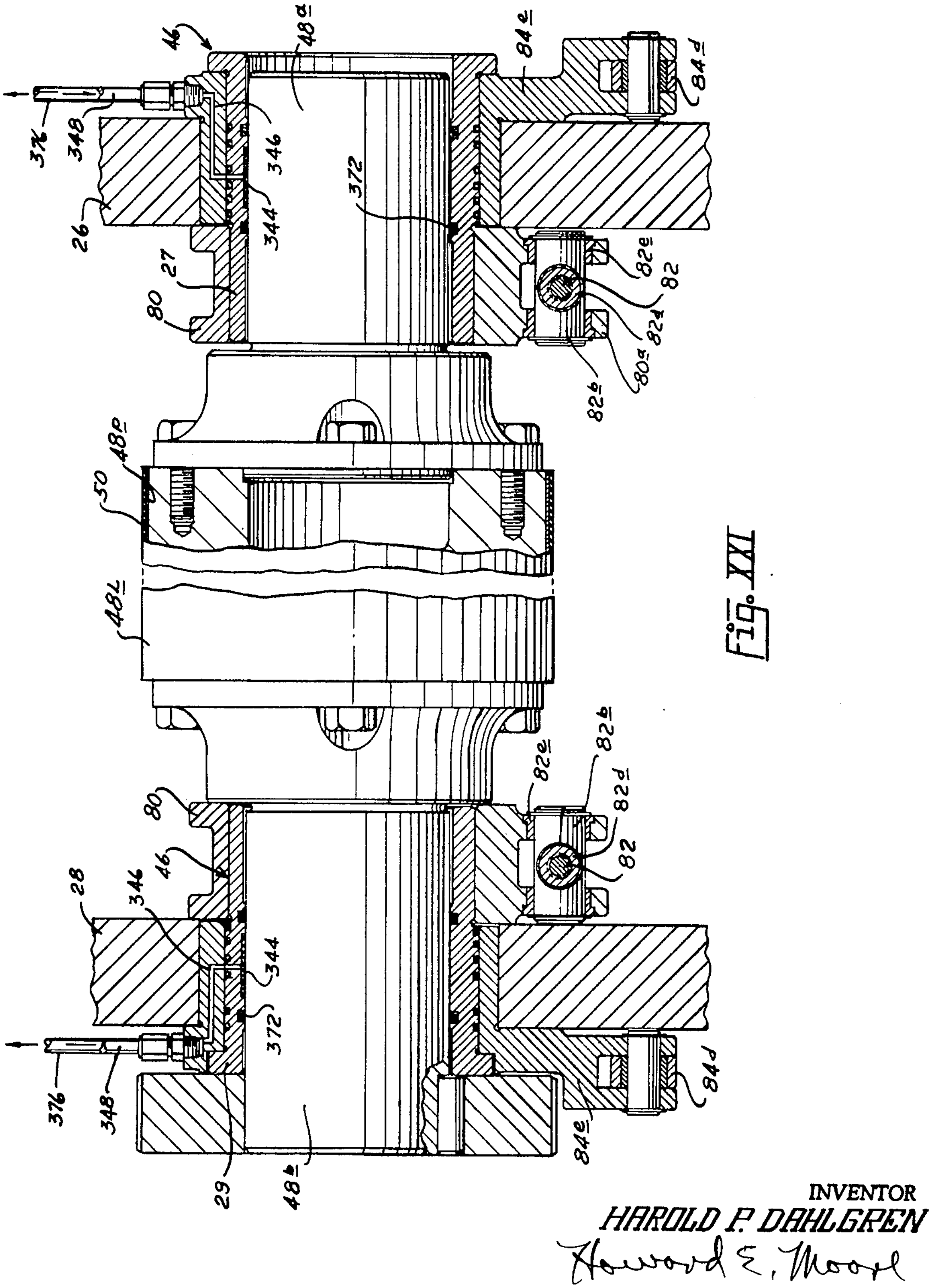
Fig. XXI
INVENTOR
HAROLD P. DAHLGREN
Howard E. Moore
BY Gerald G Crutsinger
ATTORNEY

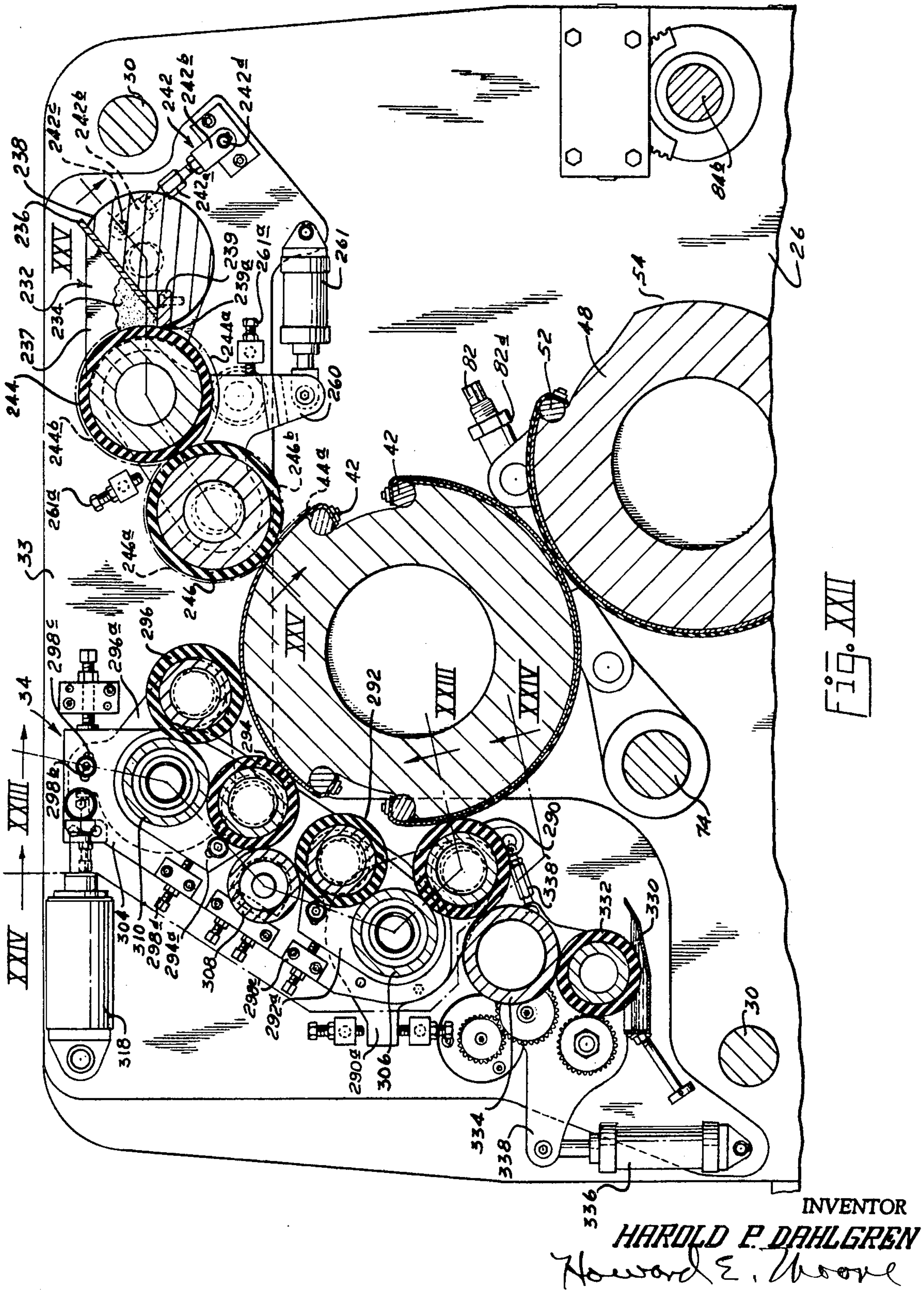
Fig. XXII
INVENTOR
HAROLD P. DAHLGREN
Howard E. Moore
BY Gerald G Crutsinger
ATTORNEY

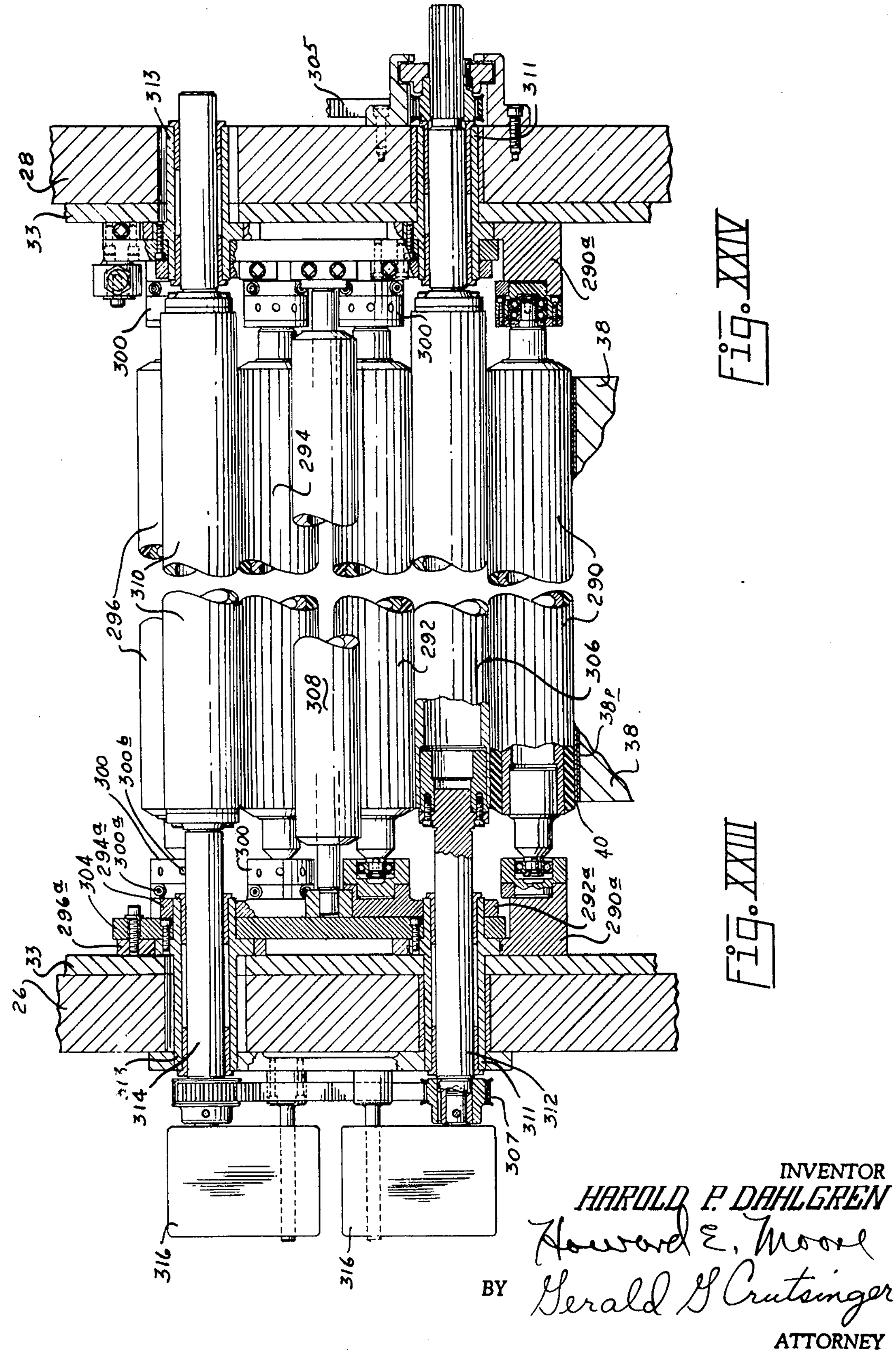
Fig. XXIV
Fig. XXIII
INVENTOR
HAROLD P. DAHLGREN
Howard E. Moore
BY Gerald G Crutsinger
ATTORNEY

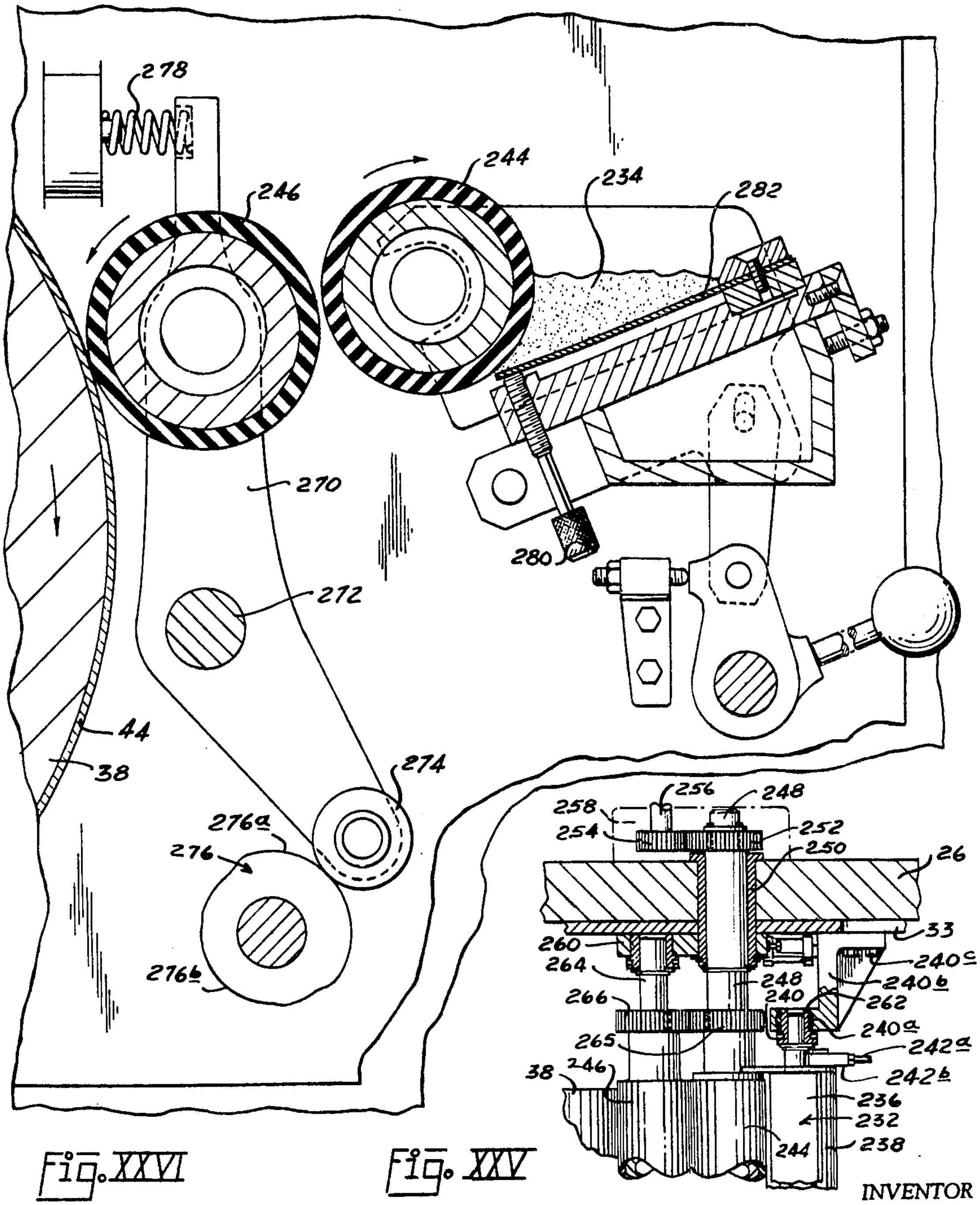
Fig. XXVI Fig. XXV
INVENTOR
HAROLD P. DAHLGREN
Howard E. Moore
BY Gerald G Crutsinger
ATTORNEY

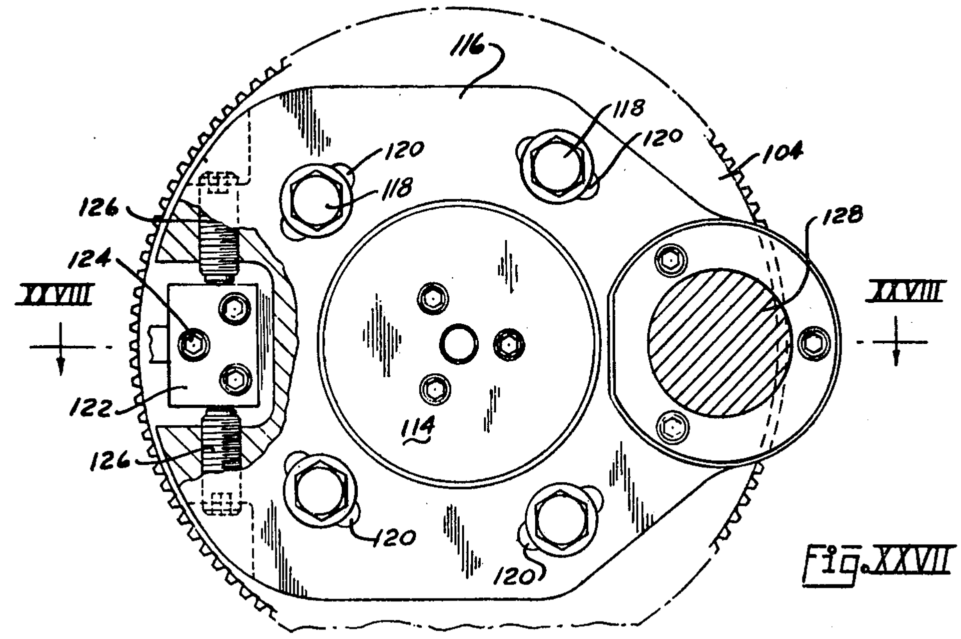
Fig. XXVII
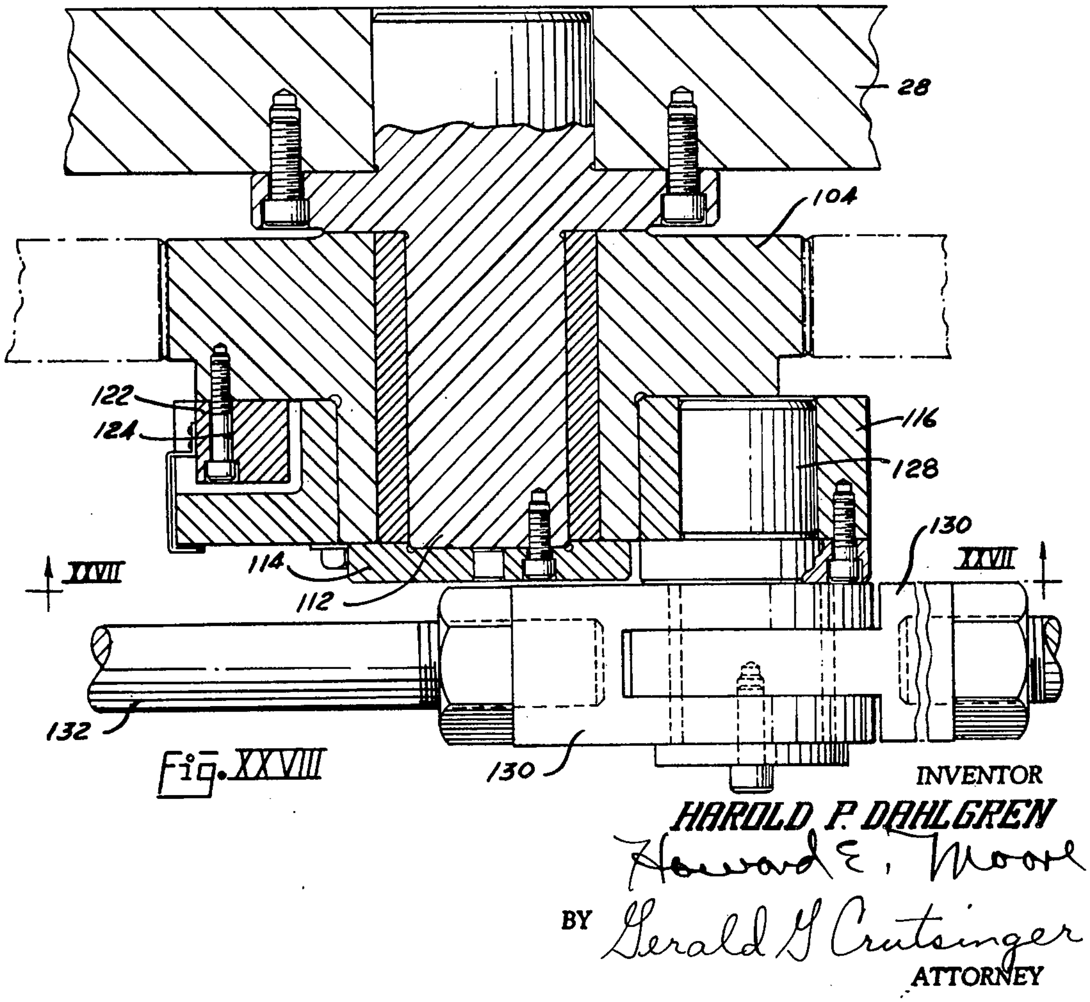
Fig. XXVIII
INVENTOR
HAROLD P. DAHLGREN
Howard E. Moore
BY Gerald G Crutsinger
ATTORNEY

HYDROSTATIC BEARER FOR PRINTING PRESS

CROSS REFERENCE TO RELATED APPLICATION

This is a continuation, of application Ser. No. 207,499 filed Dec. 13, 1971, now abandoned, which was a continuation-in-part of my copending application Ser. No. 737,521, filed June 17, 1968, entitled "Straight Feed Press", now U.S. Pat. No. 3,664,261.

BACKGROUND OF THE INVENTION

No significant advances have been made presenting new concepts in sheet-fed printing systems for decades. Printing systems designed for the sheet-fed printer are basically the same and allow printing on one side of the sheet at a time, requiring sheets to be turned over and rerouted through the press for single or multi-color perfecting. Sheets are progressively and meticulously transferred in serpentine fashion about transfer and impression cylinders and hopefully registered from one cylinder to another and from one printing unit to another until finally they emerge as a printed product. Printing units must be synchronized for color register through numerous drive and idler gears and consequently presses are extremely complex, massive units which are very expensive to manufacture because of numerous transfer and printing cylinders and mechanisms related thereto.

One or two color sheet-fed perfectors have been developed heretofore. However, these machines were specifically designed for specific jobs, such as mass production of paperback books, and are totally unsuitable for high speed production of four-color process printing on both sides of the paper.

Heretofore no sheet-fed press had the capability of printing on two sides of a sheet in as many as four colors by passing the paper through the press one time.

It is the common and accepted practice in the printing industry to run a sheet to be printed through the sheet-fed press a multiplicity of times to attain multicolor printing on two sides of a sheet. After each pass of the sheet through the press, the plates must be changed and the press made ready for the next pass to apply other colors or to print on the back of the sheet. It is readily apparent to those skilled in the printing art that a considerable amount of time is spent making sheet-fed presses ready to print and in attaining proper registry of the numerous components of the press.

In a typical four-color one-side printing press a sheet delivered from the feeder is caught by the gripper bars of a first transfer cylinder. The sheet is folded around the transfer cylinder and carried to the grippers on the first impression cylinder where the grippers of the transfer cylinder release the paper and it is caught by the grippers of the impression cylinder. The grippers on the impression cylinder rotate the paper into contact with the blanket cylinder where printing is accomplished in one color on one side of the sheet. When the grippers on the impression cylinder release the sheet, grippers on a second transfer cylinder grasp the sheet, causing the printed surface to be in contact with the transfer cylinder while it is rotated to the grippers of a second impression cylinder. The grippers of the second transfer cylinder release the sheet as it is caught by the grippers of the second impression cylinder which rotates the sheet into contact with a second blanket where a second color is applied to the same side of the sheet. Grippers on a third transfer roller catch the sheet as it is released by the grippers of the second impression cylinder and the printed surface is again brought into contact with a transfer cylinder while it is being delivered to the grippers of a third impression cylinder. This process is continued until the sheet passes to delivery. When one side of the sheet is completed, the press is replated, the sheets are turned and re-fed through the press to print the other side of the sheet.

Virtually all sheet-fed printing presses heretofore developed have the characteristic of feeding the sheet serpentine fashion through the press while the grippers associated with each cylinder catch the sheet as it is being released by the grippers of the previous cylinder.

One of the major problems encountered by the printing industry lies in synchronizing the various cylinders whereby the sheet will be grasped and released at the proper moment for maintaining registry between the cylinders of successive towers so that colors do not overlap or separate.

Chains have been used in the past with limited success to transfer sheets from one printing station to another. Grippers supported by the chain have to be positively indexed to the printing station cylinders before sheet transfer can be accomplished with any degree of register between stations.

A chain has inherent limitations as a smooth transfer media because chordal motion of the links limit smooth flow; linear deformation of the chain results from numerous pivot joints; lubrication requirements at joints, to help prevent wear, noise, shock and vibration, present maintenance problems.

The gripper and chain transfer media could not, by itself, register the sheet between printing stations, even with the chain travelling precisely at cylinder speeds. As a compromise, grippers had to be loosely supported on the chain, moved from normal position, and indexed to printing station cylinders prior to actual sheet transfer at the cylinder. As soon as sheet transfer was accomplished and the gripper became separated from index with the cylinder, the gripper jumped or jerked back into its normal relation with the chain.

In the transfer system employed and disclosed herein, there is no contact between tape directed gripper bars and the printing cylinders thereby eliminating shock, vibration, wear, noise, mis-register and the other apparent problems accompanied by chain supported grippers being indexed to cylinders. The printing cylinders are entirely independent of the sheet transfer mechanism and vice versa except for speed synchronization of cylinder surface speed with that of the tape.

Another problem has been the offsetting of wet ink on transfer cylinders from the freshly printed surface on the paper and consequently back on to the next sheet that is passed through the press. Heretofore, presses with a multiplicity of towers for applying more than one color of ink to the sheet were driven by a common drive through a complex gear train or through long shafts which have inherent distortion thereby increasing the problem of synchronizing components of the press thereby making precision registry more difficult.

Typical four-color one-side printing presses have an average of about twenty cylinders including the plate cylinders, blanket cylinders, impression cylinders, transfer cylinders and skeleton wheels.

Sheet-fed printing presses heretofore used have relatively low production speeds which never exceed eight thousand impressions per hour.

All sheet-fed presses heretofore used have basically the same complex ink fountain with keys to vary the ink flow and an ink train consisting on an average of about twenty rollers for smoothing and distributing the ink to the plate cylinder.

A universal characteristic of sheet-fed printing presses heretofore used has been the employment of massive bearers on each end of the plate and blanket cylinders to assure rotation of the cylinders without vibration when the cylinder load is reduced because of gaps in the cylinders. The use of bearers has been necessitated by limitations of bearings heretofore incorporated into the design of presses for journaling the cylinders.

Apart from the equipment design being basically the same, one only has to be briefly associated with problems in the industry to see that printing problems, too, are the same for the similarly designed presses; namely, extensive time and effort are required for make-ready; extreme difficulty in obtaining and maintaining register between colors; streaking and slur caused by gear lash and deformation or by vibration and shock of complex mechanism movements; offsetting caused by the printed side of the sheet being in contact with transfer cylinder and skeleton wheel surfaces; sheet or board fatigue; considerable downtime for maintenance caused by breakdown of the complex mechanical systems; problems relating to ghosting on certain printing layouts; problems relating to control of ink-water balance and sometimes the most neglected problem of all, that of requiring personnel having special skills, talents, experience and perserverance to "get the job done" with the above mentioned type of printing systems.

All the above problems are related basically to problems involving lack of versatility, quality, economy and ease of operation, and are largely caused by the stereotype conventional design of the present day printing system.

Since the problems for the sheet-fed printer are not being readily solved by "updating and face-lifting" of the old concepts of printing, the only apparent alternative has been to switch to web-offset lithography. Here the printer can print several colors on two sides of the sheet at the same time with increased production. In addition to the multi-color perfecting capability the web-press is superior to the sheet-fed press in specific situations because higher production rates and lower break-even points are possible.

This at first would seem to be the answer, except for the fact that many of the problems existing in sheetfed printing also exist in web-offset; namely, lack of color register caused by deformation of long drive shafts; basically the same kind of ink fountain with keys used in sheet-fed presses; a complicated train of rollers and conventional water fountain systems; common drive for the entire press; roller or ball-bearings with massive cylinder bearers on the plate and blanket cylinders; and printing cylinders are universally the same circumference as the finished sheet cut-off length, allowing absolutely no time for recovery of the inking form rollers after they finish a printing cycle.

Apart from problems common to the conventional sheet-fed operation, switching from sheet-fed to web-offset lithography presents other distinct disadvantages.

A web-offset press is limited to one sheet length equal to the circumference of the plate cylinder. When shorter sheet lengths are required excessive waste results from non-use of the unprinted web portion. Another complete press system must be designed, manufactured, purchased and used for printing different sheet sizes to avoid excessive waste of paper. Web presses are generally more expensive because of complex folders, dryers, chill devices, etc., necessary. More time is usually required for make-ready and more waste is encountered since the web must be running through the press and desirably at production speeds while registering and while color correction changes are being made because it is difficult to compensate for wind-up of the drive system when the press is stopped. Crews trained for printing on sheet-fed equipment find that they must learn new skills when using web equipment.

The printing industry is faced with a dilemna of the sheet-fed and web-fed printing operations, each having decided advantages over the other, while sharing common problems which are inherent in the stereotyped press design which has been virtually unchanged for decades.

SUMMARY OF THE INVENTION

I have developed a novel sheet-fed offset lithographic printing press which incorporates the advantages of sheet-fed equipment heretofore employed and the advantages of the web-press, while eliminating deficiencies of each.

By eliminating elements which did not contribute to the success of the lithographic printing press but which prevented or defeated it, I have developed a sheet-fed printing press which has the capability of perfecting, i.e., printing on both sides of the sheet at the same time, in any desired number of colors while the sheet is passed one time through the printing press.

I have eliminated all transfer cylinders, impression cylinders and skeleton wheels which have been used heretofore for feeding a sheet through the press serpentine fashion.

I have developed a sheet-fed printing press which incorporates a straight through and continuous sheet transfer principle similar to the feeding style of web press whereby the sheet is grasped by a gripper bar after being delivered to the sheet transfer mechanism by a conventional feeder and the sheet is directed in an uninterrupted horizontal plane straight to and through one or a plurality of printing towers where printing is accomplished selectively on one side; or, on both sides of the sheet at the same instant, or any combination thereof in any desired number of colors. This eliminates turning the sheet over after printing on one side and re-feeding it through the printing system. This also eliminates the necessity for numerous cylinders, constantly gripping and releasing the sheet as has been required heretofore.

Eliminating the complex ink fountain used on conventional presses, I have developed a press with a novel ink fountain, having a rigid doctor blade and a minimum number of rollers in the ink train for applying ink to the plate cylinder.

I have eliminated the need for bearers on the blanket and plate cylinders by the use of a novel journal, which has not been used heretofore in printing presses, which operates on hydrostatic principles offering a new and unexpected result, in that it eliminates the need for bearers.

I have eliminated the common drive system and have incorporated a novel system for driving the printing towers by individual drive motors while maintaining register for multi-color printing by the use of synchronizing links for maintaining critical elements of each printing tower and the sheet transfer system in synchronization at all times.

It is a primary object of the invention to provide a sheet-fed printing press which incorporates a sheet transfer system which moves the sheet in virtually a straight horizontal line, eliminating transfer and impression cylinders, in which the sheet length is unrelated to and may be variably less than the circumference of the printing cylinder, thereby incorporating the straight feed characteristic of the web press with the variable cut-off characteristic of the sheet-fed press.

Another object of the invention is to provide a sheet-fed press in which the sheet is continuously gripped by a single set of grippers from the time the sheet enters the press until delivery, offering the ultimate in register for multi-color printing.

Another object of the invention is to provide a printing press in which the sheet is grasped at the leading edge by a set of grippers and aerodynamically supported and directed to and through one or more printing towers.

A further object of the invention is to provide a sheet-fed printing press which may be used as a perfector to print any desired number of colors on both sides of the sheet, eliminating the need for a second pass through the press.

A still further object of the invention is to provide a sheet transfer system capable of gripping and registering two sheets simultaneously in a single set of grippers to move the sheets through perfecting printing towers to print on one side of each sheet.

A further object of the invention is to provide a printing press in which the only cylinders which touch the paper are the blanket printing cylinders, thereby eliminating all costly transfer cylinders, impression cylindees, skeleton wheels, and related complex gripper mechanisms commonly used in sheet-fed presses.

A further object of the present invention is to eliminate marking caused by the offsetting of wet ink on sheets exposed to transfer cylinders and subsequent offsetting of the ink to subsequent sheets.

A still further object of the invention is to provide a sheet-fed printing press having a sheet gripping mechanism carried by an endless flexible conveyor having an in-line feeder and delivery, allowing fast but accurate control of the speed of the paper through the press.

A still further object of the invention is to provide a sheet-fed printing press in which the sheet travels through the path of least resistance thereby utilizing natural phenomena such as the cantilever effect on the sheet as it is grasped in the nip between the blanket cylinders, causing the sheet to lie tangent to the blanket cylinders due to its modulus of elasticity and also phenomena involving boundary layers of air and air pressure at the nip between opposing blanket cylinders.

A still further object of the invention is to provide a printing press having a simplified continuous inking and dampening system, eliminating problems relating to ink-water balance, emulsification, ghosting, one turn roller streaks and "hickies".

A still further object of the invention is to provide a printing press having a novel plate cylinder having a printing plate covering approximately one-half of the circumference thereof and an ink receptive recovery plate covering substantially the other half thereof associated with the ink train, allowing recovery time for redistribution of the ink on the form rollers of the ink train to eliminate ghosting.

Another object is to provide a printing press having an ink fountain which does not supply an overabundance of ink to the inking form rollers while the form rollers are in the plate cylinder gap, whereby eliminating one turn roller streak.

A still further object of the invention is to provide a printing press having an ink fountain utilizing a rigid doctor blade in contact with a resilient roller wherein the thickness of the ink film to be applied may be metered continuously and applied at a controlled, uniform rate in regulated quantities as demanded by the printing layout.

A still further object of the invention is to provide a sheet-fed printing press which may serve as a perfector in which printing is achieved on both sides of the sheet at precisely the same moment as the sheet is drawn between adjacent blanket cylinders and touches the cylinders only at the printing nip.

A still further object of the invention is to provide a sheet-fed printing press in which each blanket cylinder serves the dual purpose of a blanket cylinder for offsetting ink to the sheet and simultaneously as an impression cylinder for the blanket which is offsetting ink to the opposite side of the sheet.

These and other objects are effected by my invention as will be apparent in the following description taken in conjunction with the accompanying drawings.

DESCRIPTION OF THE DRAWINGS

The accompanying drawings illustrating the present invention are provided so that the invention may be better and more fully understood, in which:

FIG. I is a side elevational view of the operator side of the printing press;

FIG. II is a top plan view of the printing press having the inker broken away;

FIG. III is a side elevational view of the drive side of the printing press;

FIG. IV is a cross sectional view taken along lines IV—IV of FIG. II;

FIG. V is a sectional view through a typical printing tower taken along lines V—V of FIG. II;

FIG. VI is a cross sectional view taken along lines VI—VI of FIG. II showing a typical tape wheel in the delivery station;

FIG. VII is an enlarged elevational view of a typical gripper bar looking in the direction indicated by the arrows along lines VII—VII of FIG. II;

FIG. VIII is a cross sectional view taken along lines VIII—VIII of FIG. VII through a typical gripper bar with the gripper in closed position;

FIG. IX is a cross sectional view taken along lines IX—IX of FIG. II through a typical gripper bar with the gripper in the open position at the delivery station;

FIG. X is a cross sectional view taken along lines X—X of FIG. I showing the details of construction of the sheet transfer mechanism at the delivery station;

FIG. XI is a partially sectionalized fragmentary view illustrating the details of construction and mounting of a typical plate cylinder;

FIG. XII is a partially sectionalized fragmentary view illustrating details of construction and mounting of the upper blanket cylinder;

FIG. XIII is a diagrammatic view illustrating a suitable hydraulic circuit for providing lubrication to the hydrostatic bearing bearers utilized for journaling the plate and blanket cylinders;

FIG. XIV is an enlarged cross sectional view taken along lines XIV—XIV of FIG. XIII;

FIG. XV is a perspective view of a portion of a hydrostatic bearer illustrating a suitable configuration of a recess utilized for receiving lubricant for the bearing;

FIG. XVI is a perspective view of a portion of a hydrostatic bearer illustrating a suitable configuration of the annular rings utilized for draining lubricant from the bearing;

FIGS. XVII, XVIII and XIX illustrate the relationship between the blanket cylinders and the gripper bar assembly which continuously grips the sheet as the gripper bar assembly and sheet enter (FIG. XVII), pass through (FIG. XVIII) and leave (FIG. XIX) the cutaway portion of respective blanket cylinders;

FIG. XX is an enlarged cross sectional view illustrating the nip between opposing blanket cylinders while printing is being accomplished on a sheet;

FIG. XXI is a partially sectionalized fragmentary view illustrating details of construction and mounting of the lower blanket cylinder;

FIG. XXII is an enlarged cross sectional elevational view cut transversely through the rollers of the upper ink train;

FIG. XXIII is a cross sectional view taken along lines XXIII—XXIII of FIG. XXII;

FIG. XXIV is a cross sectional view taken along lines XXIV—XXIV of FIG. XXII;

FIG. XXV is a cross sectional view taken along lines XXV—XXV of FIG. XXII illustrating details of construction of the primary inker;

FIG. XXVI is an enlarged cross sectional view, similar to FIG. XXII, of a second embodiment of the primary inker;

FIG. XXVII is an elevational view, with parts broken away, of a crankplate in the synchronizing system;

FIG. XXVIII is a cross sectional view taken along lines XXVIII—XXVIII of FIG. XXVII;

FIG. XXIX is a fragmentary perspective view of a modified form of a hydrostatic bearer; and FIG. XXX is a fragmentary perspective view of the bearing illustrated in FIG. XXIX.

Numeral references are employed to indicate the various parts as shown in the drawings and like numerals indicate like parts throughout the various figures of the drawing.

DESCRIPTION OF A PREFERRED EMBODIMENT

Referring to FIG. I of the drawings the numeral 1 generally designates a sheet-fed multi-color perfecting lithographic printing press.

A feeder mechanism 2 feeds sheets of unprinted paper from a stack 4 by conventional means to a swing gripper 6. The swing gripper 6 accelerates individual sheets 5 to the velocity of gripper bars 8 carried by the sheet transfer mechanism, generally designated by the numeral 10. Sheet transfer mechanism 10 consists of tape wheels 12*a*, 12*b* and 14*a*, 14*b* which carry tapes 16*a* and 16*b*, having gripper bars 8 mounted therebetween for moving individual sheets 5 through the printing press, as will be hereinafter more fully described.

A plurality of printing towers 18 and 20 is provided, giving the press a multi-color perfecting capability. Conventional leveling devices such as jack screws (not shown) may be utilized for tower leveling.

A delivery mechanism 22 grips the individual sheets 5 as they are released by gripper bars 8 of the sheet transfer mechanism 10 and positions the sheets by conventional means in a stack of printed sheets 24.

Referring to FIGS. II and V of the drawing, each printing tower 18 and 20 has a side frame 26 on the operator side and side frame 28 on the drive side of the printing press joined by tie bars 30 forming a strong rigid structure upon which various components of the press are mounted. Feeder 2 and delivery 22 have operator side side frames 2*a* and 22*a* and drive side side frames 2*b* and 22*b* respectively. Structural ties 31 join the side frames of individual towers 18 and 20 and side frames of the feeder 2 and delivery 22.

Primary inkers 32 and secondary inkers 34 cooperate with dampeners 36 to provide a proper balance of ink and dampening fluid to the plate cylinders 38, which are duplicated at the upper and lower ends of the tower.

PLATE CYLINDER

Plate cylinders 38, FIGS. V and XI, are rotatably journaled at opposite ends thereof in side frames 26 and 28 in bearings 27 and 29. It should be noted that plate cylinders 38 differ from conventional plate cylinders in two very important aspects.

First, the printing plate 40 does not cover substantially all of the circumference of plate cylinder 38, FIG. V. Printing plate 40 wraps around substantially one-half of the circumference of plate cylinder 38.

Both web and sheet-fed presses heretofore developed have covered as much of the surface of the plate cylinder as possible with the plate. This has been necessitated in web presses to reduce waste of paper and in the sheet-fed presses to make a more compact press.

Plate 40 is detachably secured to plate cylinder 38 by conventional plate clamps 42 conventionally positioned in gap 39. An ink pad 44 is mounted in a similar manner as plate 40 and covers substantially the remaining circumference of plate cylinder 38.

Ink pad 44 is an ink receptive plate having an effective diameter slightly greater than that of the effective diameter of the plate 40. In view of the fact that the surface of the ink pad 44 is of greater radial distance from the center of the plate cylinder 38 than the radial distance from the center of the plate cylinder to the surface of plate 40, ink is distributed over ink pad 44 by primary inker 32 and the ink is spread over the form rollers of the secondary inker 34 from pad 44, while plate 40 does not contact rollers of the primary inker but receives ink only from the form rollers of the secondary inker.

Utilization of the ink pad 44 allows great simplification of the conventional ink train, while overcoming ghosting problems often encountered by lithographers using conventional inking systems. Since plate 40 does not cover the substantial circumference of plate cylinder 38, form rollers in the ink fountain have sufficient time to recover, eliminating ghosting as will be hereinafter described.

The second important deviation of plate cylinder 38 from the conventional plate cylinder is the elimination of bearers. Bearers have been universally used on plate cylinders and blanket cylinders to prevent vibration when cutaway portions of the plate cylinder and blanket cylinder come into rolling contact.

Plate cylinder 38 has reduced diameters at opposite ends thereof, forming journals 38a and 38b which are supported by bearings 27 and 29 respectively in the side frames 26 and 28. One end 38a of plate cylinder 38 is captured by the lateral register adjustment 58, as will be hereinafter explained, while the other end 38b is free to slide axially through bearing 29. This construction provides automatic compensation for thermal expansion of plate cylinder 38.

I have eliminated the need for bearers by replacing conventional ball, sleeve and roller bearings with a hydrostatic bearer 46, FIGS. XI–XVI, which is machined to very close tolerance between bearing sleeve 27 and 29 and journals 38*a* and 38*b* on the plate cylinders 38 and journals 48*a* and 48*b* on blanket cylinders 48, allowing virtually no vibration of the plate cylinder as will be hereinafter more fully explained.

BLANKET CYLINDER

When printing is being accomplished blanket cylinders 48 are in rolling contact with plates 40 on plate cylinders 38, FIG. V. On each upper and lower unit, blanket 50 is detachably secured to blanket cylinder 48 by conventional blanket clamps 52 and is of substantially the same length as plate 40, thereby covering the same proportion of the circumference of blanket cylinder 48 as plate 40 covers on plate cylinder 38 which is equal in diameter to blanket cylinder 48. Each blanket cylinder 48 has a recessed area 54 on the outer surface, providing clearance for the ink pad 44 on plate cylinder 38 to prevent contact between the blanket cylinder 48 and the ink pad 44.

It should be noted that as hereinbefore explained that blanket cylinders 48 do not have conventional bearers on each end thereof, but each blanket cylinder 48 has a journal 48*a* and 48*b* at opposite ends thereof supported in hydrostatic bearings 46 which will be described in detail hereinafter.

Each blanket cylinder 48 has a gap or cutaway portion 56 on the outer surface, FIGS. V, XVII, XVIII and XIX, allowing gripper bars 8 to move therebetween as they rotate.

ADJUSTMENT AND THROW OFF

Each plate cylinder 38 has conventional lateral color registering adjustment mechanism 58, FIG. I and XI. A suitable means for establishing and maintaining lateral register comprises a worm 58a and a worm gear 58b for driving a spur gear 58*c* which in turn meshes with gear teeth on a threaded adjustment screw 58*d* whereby rotation of the worm 58*a* will cause the threaded adjustment screw 58*d* to be moved laterally, thereby moving plate cylinder 38 laterally with respect to the side frames 26 and 28. Adjusting screw 58*d* threadedly engages collar 58e, rigidly connected to the operatorside side frame 26 by bolts 58*f*. Adjusting screw 58*d* has annular thrust bearing 58*g* mounted therein which is captured between shoulders 38*c* on cylinder 38 and plate 58*h* secured by bolts 58*i* to the end of plate cylinder journal 38*a*.

A conventional throw-off mechanism is utilized to separate the blanket cylinders 48U and 48L from plate cylinders 38U and 38L respectively and to separate the upper blanket cylinder 48U from lower blanket cylinder 48L when the last sheet passes from the feeder or when a sheet 5 fails to feed. A suitable mechanism, FIGS. I and V, comprises a throw-off hydraulic cylinder 60 actuated by an electric eye or other suitable means (not shown), pivotally connected to a crank 62 wherein actuation of throw-off cylinder 60 causes crank 62, which is rigidly connected to cross shaft 64, to rotate shaft 64. Crank 62, rigidly connected to shaft 64, also moves adjustable link 70 to rotate a second crank 72 rigidly secured to a second cross shaft 74. Rotation of the first and second cross shafts 64 and 74 respectively results in rotation of cranks 76 which are rigidly secured to each of said cross shafts. A rod eye 78 is pivotally connected to each crank 76 and has an adjustment screw 82 threadedly engaged therein. Screw 82 extends through and threadedly engages pin 82*b* and is secured relative thereto by lock nuts 82*c* and 82*d* threadedly engaging adjustment screw 82. Pin 82*b*, FIGS. XII and XXI, is rotatably journaled in bushings 82*e*, rigidly connected to outwardly extending lugs 80*a* on throw-off crank 80. Throw-off crank 80 is rigidly connected to eccentric bushing 27*a* and 29*a* of hydrostatic bearing 46. The eccentricity of bushings 27*a* and 29*a* causes opposing blanket cylinders 48L and 48U to move to an off impression position when throw-off cylinder 60 is actuated. It should be apparent that actuation of throw-off cylinder 60 results in rotation of throw-off crank 80 and eccentric bushings 27*a* and 29*a*, causing each blanket cylinder 48U and 48L to move from contact with plate cylinders 38U and 38L respectively and causes blanket cylinders 48U and 48L to be separated.

Paper pressure adjustment 84, FIGS. I, V and XXI, consist of a worm 84*a* rotatably mounted on the operatorside side frame 26, which rotates a worm gear segment rigidly connected to cross shaft 84*b*, transmitting rotation to lever arm 84*c* rigidly connected to cross shaft 84*b*. An adjustable rod 84*d* is pivotally connected between lever arm 84*c* and the paper pressure eccentric 84*e*.

It should be noted that paper pressure eccentric 84*e* is provided on lower blanket cylinders 48L only. Paper pressure eccentric 84*e*, FIG. XXI, is rotatably journaled in the operator-side frame 26 and the drive-side side frame 28, having eccentric bushings 27*a* and 29*a* of hydrostatic bearer 46 rotatably journaled therein. It should be readily apparent that rotation of worm 84*a* results in rotation of paper pressure eccentric 84*e*, causing the lower blanket cylinder 48L to be moved relative to upper blanket cylinder 48U, thereby providing means for adjusting the paper pressure between adjacent blanket cylinders.

Circumferential register adjustment 86, FIGS. III and XI, provide a means for rotating the upper plate cylinder 38U or the lower plate cylinder 38L relative to plate cylinder gears 108 and 100 respectively, and allows rotation of one plate cylinder relative to the other. Adjustment 86 includes an outwardly extending lug 86a on each plate cylinder gear 100 and 108, having a worm gear 86*b* rotatably journaled therein meshing with gear segment 86*c* connected by bolts 86*d* to bushing 86*e* pinned at 86*f* to journal 38*b* of each plate cylinder 38U and 38L. It should be apparent that rotation of worm 86*b* associated with the plate cylinder in one tower will impart rotation thereto, providing circumferential adjustment thereof relative to the corresponding plate cylinders of other printing towers for color register. The blanket cylinders 48U and 48L may be adjusted circumferentially relative to each other, utilizing set screws 126 in crank plates 116, FIGS. XXVII and XXVIII, as will be hereinafter more fully explained.

Utilizing set screws 126, the blanket cylinder gaps 56 may be positioned to begin printing at the desired location on each side of sheet 5 and will allow gripper bars 8 to pass through blanket gaps 56.

Referring to FIG. III of the drawing, each printing tower 18 and 20 has an individual drive consisting of a variable speed motor 90 having a drive sheave 92 mounted on the shaft thereof. Belts 94 are carried on drive sheave 92 and driven sheave 96 rotatably journaled on side frame 28 of the drive side of each towwer 18 and 20. Driven sheave 96 is rigidly connected to a lower plate cylinder drive gear 98 which meshes with the lower plate cylinder gear 100. Rotation of the lower plate cylinder gear 100 imparts rotation to lower plate cylinder 38L. Lower blanket cylinder 48L has a gear 102 rigidly connected thereto which meshes with lower plate cylinder gear 100 imparting rotation to lower blanket cylinder 48L.

A lower idler gear 104 meshes with the lower plate cylinder gear 100 and with an upper idler gear 106 which in turn meshes with upper plate cylinder drive gear 108, rigidly connected to upper plate cylinder 38U. The upper plate cylinder gear 108 meshes with the upper blanket cylinder gear 110, rigidly connected to the upper blanket cylinder 48U.

From the foregoing it should be readily apparent that motor 90 drives the lower plate cylinder and the lower blanket cylinder while transmitting power through idler gears 104 and 106 to drive the upper plate and blanket cylinders.

The pitch diameters of plate cylinder gears 100 and 108 and blanket cylinder gears 102 and 110 coincide with the peripheral surfaces of plate cylinders 38L and 38U and blanket cylinders 48L and 48U respectively, such that no slippage occurs at the plate and blanket nip 38n when the cylinders are in pressure contact.

Plate cylinder gears 100 and 108 are identical as are blank cylinder gears 102 and 110. Therefore, the surface speed of each cylinder is the same. Exact surface speed relationship is obtained between the plate cylinder, blanket cylinder and paper by placing packing 38*p* and 48*p* under the plates 40 and blankets 50, thereby packing same relative to the pitch diameters of the gears 100, 108, 102 and 110; by adjusting the pressure between adjacent plate and blanket cylinders (screw 82); bby adjusting the paper pressure (adjustment 84); and by synchronization (links 132 and 134) of individual towers 18 and 20.

Idler gears 104 and 106 are mounted on stub shafts 112, FIG. XXVIII, which are rigidly secured to the side frame 28. A retainer plate 114 is bolted or otherwise rigidly secured to the end of each stub shaft 112 to prevent axial movement of the idler gears 104 and 106 relative to the stub shafts 112.

A crankplate 116 is rigidly connected to each idler gear 104 and 106 by bolts 118 which pass through elongated opening 120 in the crankplate 116. The elongated openings 120 allow circumferential adjustment between the crankplate 116 and the idler gear.

A stop block 122 is securely attached as by cap screws 124 to the idler gear 104. Set screws 126 in crankplate 116 may be adjusted with relation to stop block 122, thereby causing crankplate 116 to rotate relative to the idler gear 104.

Crankplate 116 may be adjusted or rotated with respect to idler gear 104 by loosening bolts 118 and adjusting set screws 126 reltive to stop block 122, causing crankplate 116 to rotate to the desired position and then tightening bolts 118 through elongated holes 120 to secure the crankplate 116 to idler gear 104.

Each crankplate 116 has an outwardly extending crankpin 128 thereon upon which a rod eye 130 is pivotally mounted. Crankplate 116 on idler gear 104 of printing tower 18 is connected through a lower synchronizing link 132 to crankplate 116 on idler gear 104 of printing tower 20, best illustrated in FIG. III, forming a rigid mechanical linkage, causing idler gear 104 of each printing tower to rotate in synchronization.

The upper idler gears 106 of each printing tower 18 and 20 are similarly connected by an upper synchronizing link 134.

It should be noted that the printing stations are self-contained units powered by individual motors 90. Synchronization of multiple printing stations is accomplished by mechanical linkages 132 and 134 indirectly connecting the rotating cylinders. Load sharing is accomplished by mechanical linkages 132 and 134 so that each motor carries its portion of the load of all stations. Loads will be normally equal at each tower.

Individual drive motors 90 at each printing station are driven in unison by one central control 90*b*. This provides speed synchronization and load sharing. Controls 90*a* are located at each pronting tower for necessary maintenance and operation from that point. Printing tower controls 90*a* shall consist of: jog forward; jog reverse; emergency stop; and warning. The jogging operations will be performed at low speeds which can be adjusted for optimum convenience. The emergency stop will shut down the press in minimum time. The warning operation must be energized before any jogging may be performed. These controls are conventional and well known to persons skilled in the art.

A drive motor 90 may also be provided for the sheet transfer mechanism as hereinafter explained wherein all drive motors (connected thru the synchronizing linkages between each station and between the last station and the transfer mechanism) share the total load imposed by the printing stations 18 and 20 plus the sheet transfer mechanism 10. One control 90*b* furnishes power to all main drive motors 90.

Motors 90 are all connected in parallel so that one common field voltage from the control 90*b* supplies all motors 90, and one common armature voltage from the control also supplies all motors. Field supplies to each motor may be individually trimmed to balance electrical speed.

The dampener 36 is independently driven and controlled as fully explained in U.S. Pat. No. 3,168,037. The dampener drive will be variable speed with controls at each station and remote controls at a console or master station and speed indication and trim controls at the delivery end of the printing system.

Printing presses heretofore developed have utilized a common drive system consisting of a single motor and long shafts and complicated gear trains for delivering power to the individual printing towers. When a long bar or shaft is subjected to a torque the cross section at one end rotates with respect to the cross section at the other end, resulting in twist or angular displacement of one end of the shaft with respect to the other end. Deflection of drive shafts causes the printing towers to get out of register which results in poor printing quality. Likewise presses utilizing complicated gear trains experience gear lash with the same accompany-register problems.

synchronizing links 132 and 134 will be subjected to slight differential loading and therefore the deflection problem heretofore experienced will be non-existent.

While the feeder 2 and delivery mechanism 22 may be driven by individual drive motors in the same manner as heretofore described with respect to printing towers, the particular embodiment shown in the drawing utilizes synchronizing links 136 and 138 to transmit power from motor 90 of printing tower 18 and 20 through idler gears 104 and 106 to drive gears 140 and 142 rotatably journaled on the drive-side side frame 2*b* and 22*b* of the feeder mechanism 2 and the delivery mechanism 22, FIG. X. The lower synchronizing link 136 is pivotally connected at its opposite ends to crankpins 128 on crankplates 116 one of which is secured to lower idler gear 104 and the other to lower idler gear 140. Gear 140 is rotatably journaled on stub shaft 144 rigidly connected to the drive-side side frame 2*b* and 22*b* of the feeder station 2 and delivery station 22. Lower gear 140 meshes with upper gear 142 rigidly mounted on one end of cross-shaft 146, rotatably journaled in side frames 22*a* and 22*b* in bearings 148, having a drive gear 150 rigidly mounted on the opposite end thereof. Drive gear 150 meshes with tape wheel gear 152 rigidly connedted to the tape wheel axle 155.

From the foregoing it is readily apparent that power from motor 90 of printing tower 20 provides power through synchronizing links 136 and 138 to the tape wheel axle 155 of the delivery mechanism 22. Power is supplied to the tape wheel axle 154 of feeder mechanism 2 in substantially the same manner as will be hereinafter explained.

It should be noted that crankplate 116 on the upper idler gear 106 is rotated 90 degrees with reference to crankplate 116 on lower idler gear 104. The particular configuration causes lower link 132 to be most efficient as a torque transmitting member at the instant that upper link 134 is least efficient and vice versa.

The gearing is such that the speed of sheet 5, carried by gripper bar 8, of sheet transfer mechanism 10 is equal to the surface speed of the blanket cylinders 48 so that no slippage occurs as sheet 5 passes through the printing nip 50*n*.

A cover 117 is bolted or otherwise rigidly secured at its opposite ends to the drive side 2*b* and 22*b* of the printing press and extends longitudinally thereof. Cover 117 extends outwardly from the press, forming a protective guard around links 132 through 138, crankplates 116 and gears 100, 102–110. Additional covers 31*a* serve as windshields for sheets 5, preventing movement of air currents about the sheet which could cause the sheet to wrinkle or flutter as it passes through the system.

SHEET TRANSFER MECHANISM

The sheet transfer mechanism, hereinbefore briefly described, includes tape wheels 12 and 12*b* rigidly connected to tape wheel axles 154 rotatably journaled in the side walls 2*a* and 2*b* of feeder station 2 and tape wheels 14*a* and 14*b* rigidly connected to tape wheel axle 155 rotatably journaled in tape wheel hangers 156 adjustably secured to side walls 22*a* and 22*b* of delivery station 2.

Referring to FIG. X of the drawing, it should be noted that tape wheel hangers 156 are rotatably secured to bearings 148 in which cross shaft 146 is journaled. Hangers 156 allow the distance between the tape wheel shafts 154 in the feeder station 2 and tape wheel shaft 155 in the delivery station 22 to be adjusted for regulating the tension in tapes 16*a* and 16*b*.

Hangers 156 are provided in the delivery station only. However, it should be readily apparent that tape wheel axle 154 or 155 could be supported in hangers 156 as desired.

As illustrated in FIG. IV, tape wheel axle 155 has a bushing 156*a* rotatably journaled thereon, having outwardly extending lug 156*b* rigidly connected thereto. A pre-load adjusting screw 156*c* is hingedly connected to lug 156*b* by a pin 156*d*. A stationary block 156*e* is rigidly secured to the side wall 22*b* of delivery station 22 by bolts 156*f* while sliding block 156*g* is adjustably secured to the side walls by bolts 156*h* through elongated holes. Guide pins 156*i* extend through blocks 156*f* and 156*g* having springs 156*j* therearound between said blocks. An adjusting nut 156*k* threadably engages adjusting screw 156*c*

It should be readily apparent that tension in tapes 16*a* and 16*b* may be adjusted or pre-loaded by rotating pre-load adjustment nut 156*k* relative to block 156*g*. While it is comtemplated that tapes 16*a* and 16*b* will move in a smooth uniform fashion, springs 156*j* on guide pins 156*i* are provided for absorbing excessive shock and to prevent breaking of parts of the sheet transfer mechanism 10.

Springs 156*j* also serve as an expansion joint for the tapes 16*a* and 16*b*, eliminating thermal stresses which would result in the tapes if axle 155 were rigidly anchored.

The distance between gripper bars 8 will ordinarily be equal to the circumference of plate cykubders 38U and 38L. However, the gripper bars may be positioned at distances equal to multiples of the circumference of the plate cylinders if it is deemed expedient to do so.

Tapes 16*a* and 16*b* may be of any length as long as the length of each tape is equal to a multiple of the circumference of plate cylinders 38U and 38L.

It should be noted that the use of the straight line sheet transfer mechanism 10 allows individual printing towers 18 and 20 to be unevenly spaced if it is deemed expedient to do so. Therefore, a multi-color press could have individual printing towers arranged with varying spaces therebetween providing great flexibility, allowing the printing press to be installed in a building without modification where it might be necessary to modify the building for installation of a conventional printing press.

Referring to FIG. X, tape wheel axle 155 extends through slot 155*a* in the operator-side side frame 22*a* of the delivery station 22 having tape wheel gear 152 mounted on the outside of the side frame, allowing tape wheel axle 155 to be adjusted by the tape pre-load adjustment nut 156*k*. Gear 150 on crankshaft 146 is also mounted on the outside of the side frame meshing with tape wheel gear 152.

It should be noted that adjustment of the position of axle 155 causes gear 152 to be moved about the center of shaft 146 thereby maintaining gears 150 and 152 in meshing relation.

Delivery wheels 145 are rigidly connected to cross-shaft 146 by a pin 145*a*, providing power for delivery station 22.

Tape wheel axle 154 in the feeder station is journaled in side walls 2*a* and 2*b* thereof. Tape wheel gear 152, FIG. II, is mounted on the inside of the side frame 2*a* of feeder station 2. Gear 150, mounted on cross-shaft 146 of the feeder station, is also mounted on the inside of the operator-side frame 2*a* in driving relation with tape wheel gear 152.

Cross-shaft 146 on the feeder station 2 extends through the side frame 2*a* of said feeder station 2 and has a cam plate 147 rigidly secured to cross-shaft 146 outside of the side frame 2*a*, FIG. I. A stub shaft 147*a* is mounted on the outside of the side frame 2*a* of feeder station 2 which has a bell crank 147*b* rotatably mounted thereon. Cam follower 147*c* is rotatably journaled on bell crank **147*b* in rolling contact with cam plate 147. A second bell crank 147*e* is rigidly connected to actuator shaft 147*d* of swing gripper mechanism 6 of feeder station 2. An adjustable link 147*f* connects the lower ends of first bell crank 147*b* and second bell crank 147*e* while a spring 147*g*, connected to the upper end of bell crank 147*e*, urges said bell crank in a counter clockwise direction. It will be apparent that spring 147*g* acting through bell crank 147*e*, link 147*f* and bell crank 147*b* urges cam follower 147*c* toward the face of cam plate 147. Cam 147 and related linkage is a means for delivering power to feeder station 2 from drive motor 90 of printing towers 18 and 20**.

As hereinbefore pointed out, feeder station 2 and delivery station 22 may be individually powered, if it is deemed desirable to do so. Synchronizing links 136 and 138 would then function in exactly the same manner as synchronizing links 132 and 134 for maintaining individual components of the sheet transfer mechanism 10 in synchronization with the components of individual printing towers 18 and 20.

As best seen in FIG. I and II of the drawing, each tape **16*a* and 16*b* is an endless flexible conveyor having sufficient tensile strength so that no appreciable stretch or lineal deformation results within the range of forces applied thereto in its present application. Tapes 16 may be constructed of any suitable material such as a single strand steel tape, a multiple strand cable, or belt. However, a steel tape is utilized in the particular embodiment shown in the drawing. Tape 16*a* is carried about tape wheels 12*a* and 14*a* journaled on one side of the printing press while a second tape 16*b* is carried about tape wheels 12*b* and 14*b*** journaled on the other side of the printing press.

Each tape wheel **12*a*, 12*b*, 14*a* and 14*b* has V-blocks 158, FIGS. VI, IX and X, radially spaced adjacent the circumference thereof. Each V-block 158 has a key 160 extending outwardly from one face thereof which is complementarily received by key way 162 in the tape transfer wheel 14*b* in FIG. VI. V-block 158 is adjustably secured to the tape transfer wheel by bolts 164 extending through elongated holes 168 in V-block 158 to threadedly engage the transfer wheels. A support block 170 is secured to the tape wheels adjacent V-blocks 158 by bolts 172 and has an adjusting screw 174 extending therethrough. V-blocks 158 may be adjusted on the tape transfer wheels by loosening bolts 164, allowing movement of the V-blocks 158 by rotation of adjusting screw 174. When the desired position is attained bolts 164 and jam nut 176 on adjusting screw 174 are tightened, thereby rigidly connecting the V-block to tape transfer wheels. V-blocks 158 are mounted on tape transfer wheels 12*a*, 12*b*, 14*a* and 14*b*** in the same manner.

Each gripper bar assembly 8 includes a support bar 178 ridigly connected to tapes **16*a* and 16*b* by any suitable means such as locating pins 180, FIG. VII. Heads 182 of locating pins 180 are received by peripheral recesses 184 in each tape wheel 12*a*, 12*b*, 14*a* and 14*b*. Each support bar 178 has outer guide rollers 186*a* and 186*b* and inner guide rollers 188*a* and 188*b* rotatably mounted on each end thereof. Each guide roller is mounted on axle 190 of support bar 178 which has a bushing 192 rotatably mounted thereon held in proper position by thrust washer 194 and a jam nut 196. A set screw 198 is provided in jam nut 196 to prevent loosening of jam nut 196**.

An actuator shaft 200 is rotatably mounted in backup plate supports 202 which are welded or otherwise rigidly connected to the support bar 178.

A backup plate 204 is rigidly connected by bolts 206 to backup plate supports 202 and extends transversely between tapes **16*a* and 16*b*, which are spaced apart, in substantially parallel relationship to support bar 178 and actuator shaft 200**.

A plurality of conventional gripper finger support assemblies 208 are rigidly connected to actuator shaft 200 in spaced apart relation through out the length thereof. A gripper finger 210 is rigidly connected to each gripper finger support assmebly 208 by a cap screw 212.

A torsion spring 214 is positioned about and connected between actuator shaft 200 and the backup plate support 202, applying torque to actuator shaft 200 to provide a substantial force, causing pin **200*a* on shaft 200 to be maintained in engagement with actuator shaft stop 200*b* extending outwardly from backup plate support 202 to grip a sheet of paper 5 between gripper fingers 210 and backup plate 204. As best seen in FIG. VIII, compression spring 209 urges the gripper finger support assembly 208 and shaft 200 in a counter clockwise direction. Torsion spring 214 overcomes the forces exerted by compression springs 290 and urges pin 200*a* in a clockwise direction into contact with stop 200*b***.

It is very important that sheet 5 not slip relative to gripper fingers 210 and backup plate 204 after the sheet has been gripped. The spring constant of the torsion spring 214 and the number of gripper fingers 210 necessary to accomplish this result may vary depending upon the size and weight of the sheet 5 for specific printing operations.

Cam followers 216 are rotatably journaled on actuator arms 218 adjacent tape wheels **12*a*, 12*b*, 14*a* and 14*b*. Arms 218 are rigidly connected to actuator shaft 200. Cams 220 are fixedly secured by bolts 222 to the tape wheel in such a relationship to the cam followers 216 that rotation of the tape wheel will bring the cams 220 into contact with the followers 216, thereby rotating actuator arms 218 and actuator shafts 200 against force exerted by the torsion spring 214, causing gripper fingers 210 to rotate away from backup plate 204. The exact position and configuration of the cams 220 may be varied in a specific operation whereby the gripper fingers 210 will be rotated relative to backup plate 204 to grip a sheet at the precise moment it is swung into proper position by swing gripper 6 from the feeder mechanism 2 and to release the sheet after printing has been accomplished thereon when the sheet has been conveyed to the delivery mechanism 22**.

While the specific description has been directed to tape wheel **14*a* and 14*b* (FIGS. VI–X), it should be noted that tape wheels 12*a*, 12*b* and grippers associated therewith have the same general configuration and operate in substantially the same manner. The tape carried gripper assemblies 8, rigidly connected to the endless flexible conveyor tapes 16*a* and 16*b* by locating pins 180, grasp a sheet of paper 5 from the swing gripper assembly 6 of the feeding mechansim 2, move the sheet in a straight horizontal line to and through the printing towers 18 and 20, release the sheet when it is gripped by the delivery mechanism 22 and the gripper assemblies 8 return to the feeder mechanism 2** to pick up another sheet.

As best illustrated in FIG. IX of the drawing V-blocks 158 receive the inner guide rollers 188 as tape wheels 12*a*, 12*b*, 14*a* and 14*b* rotate, causing the tapes 16*a* and 16*b* and the gripper assemblies 8 to rotate therewith.

Inner tracks 224*a* and 224*b* and outer tracks 226*a* and 226*b* extend longitudinally throughout the printing press at the upper and lower ends thereof and are positioned to receive and guide the inner and outer guide rollers 188*a*, 188*b* and 186*a* and 186*b* respectively, thereby supporting the weight of each gripper bar 8 as it travels between tape wheels 12*a*, 12*b* and 14*a*, 14*b*. As best seen in FIG. VI of the drawing, the path of travel of the gripper bars 8 are defined by the configuration of the opening between the inner track 224 and the outer track 226. One of the outer guide rollers 186*b* on each support bar 178 has a groove 228 therein which receives and rolls along an upwardly extending portion 230 of the outer track 226 on one side of the press. It should be readily apparent that the gripper bars 8 will be guided by the outer track 226*b* because lateral alignment is maintained by the groove 228 on the outer guide wheel 186*b* while the inner track 224*b* above the inner guide roller 188*b* prevents disengagement of the groove 228 from the upwardly extending portion 230 of the outer track 226*b*.

As best illustrated in FIG. X, the other outer guide roller 186*a* on each support bar 178 does not have a groove 228 thereabout. This provides means for automatically compensating for therml expansion of support bar 178 because the guide roller 186*a* is free to move laterally relative to the outer track 226*a*.

While guide tracks 224 and 226 are shown to be straight and horizontal in FIG. IV, it should be readily apparent that the tracks may be inclined or curved to conform with any desired configuration if it is deemed expedient to do so. I anticipate the use of the above described continuous gripping tape controlled gripper bar 8 with tracks curved or inclined in a vertical or horizontal plane for controlling the path of a sheet through a printing press regardless of the geometric configuration of individual printing towers and the components thereof.

Sheet 5, accelerated by conventional swing gripper assembly 6, is gripped firmly along its leading edge by the tape carried gripper bar assemblies 8 while the remainder of the sheet is aerodynamically supported and floated on air to the first printing tower 18.

Sheet transfer mechanism 10 hereinbefore described causes the sheet 5 to travel along the path of least resistance, thereby causing the sheet to attain a position in a plane parallel with its direction of travel.

Shaping of the outside of an object to provide as little air resistance as possible to desirable in the design of objects which are to travel fluently through the air. However, even well-designed streamlined objects have drag caused by skin friction, causing a boundary layer of air adjacent the surface of the object to move with the object.

Moving air pushes up against flat surfaces held at an angle to the direction of air flow and therefore surfaces moved through the air are pushed upward by the force of air against their under surfaces. The sheet being held along its leading edge, with the remaining portion unsupported, is curved progressively downwardly due to the weight of the unsupported length of the sheet. This shape produces in air foil and consequently when the sheet is pulled forward along its leading edge the air moves faster across the top of the sheet than beneath it. The pressure of the fast moving air is, therefore, less above the sheet than beneath it and accordingly the sheet will be lifted along its unsupported length. It should be apparent that the flexible sheet, suspended at its leading edge in gripper bar assemblies 8, will attempt to achieve an equilibrium position due to the upward force of air on the lower portion of the sheet and also because of the low pressure air above the sheet, resulting from the air foil when the sheet is curved.

It should be noted that lift of an air foil is proportional to the square of the air speed. Therefore, even at relatively low printing speeds adequate lift is provided for positioning the sheet in a plane parallel to its direction of travel. The air pressure acting upon the sheet lifts the unsupported surface of the sheet, coupled with laminar flow of air along its surfaces, allows the sheet to glide swiftly and smoothly from one printing station to another.

While the support bar 178 of the gripper bar assembly 8 is shown to be substantially rectangular in the drawing, the leading edges of the support bar 178 may be of any configuration deemed expedient for reducing air turbulence along the sheet or to increase lift if sufficient lift is not accomplished at very low air speeds for heavy weight sheets. Slots or openings in the support bar near the leading edge of the sheet may be incorporated into the gripper bar assembly for directing air currents across the sheet 5.

In FIG. XVII of the drawing, the sheet 5 is shown as the gripper bar assembly directs the sheet into relation with the blanket cylinders 48U and 48L for beginning the printing cycle.

Referring to FIG. XVIII of the drawing, the sheet is shown in position just as the blanket cylinders 48U and 48L contact the sheet. It should be noted that as the blanket cylinders contact the sheet 5, additional forces are exerted upon the sheet, tending to cause the sheet to lie in the plane perpendicular to the center line between the opposing blanket cylinders. The sheet gripped at the nip 50n between the blanket cylinders acts as a uniformly loaded cantilever beam. The equation for the elastic curve of a uniformly loaded cantilever beam is $y = -w/(24EI)\ (x^4 - 4L^3x + 3L^4)$ where $y$ equals the deflection of the beam, $w$ equals the unit weight of the material, E quals modulus of elasticity, $x$ equals the distance from the unsupported end of the beam, and L equals the length of the beam. Obviously, where $x$ is equal to L at the supported end of the beam, the deflection of the beam is zero.

As best seen in FIG. XX of the drawing, the boundary layers of air 50*p* adjacent the surfaces of the blanket cylinders 48U and 48L and the boundary layer of air 5a adjacent each side of the sheet 5 are compressed as any given portion of the sheet approaches the nip 50*n* between the blanket cylinders. Pressure wedges 50*w* are formed above and below the sheet 5, also contributing to hold the sheet straight out and away from the printing cylinders in an equilibrium position, substantially bisecting the cusp area C formed by the converging curved surfaces of the opposing blanket cylinders, immediately prior to entering the nip 50*n* where printing is accomplished.

As best seen in FIG. XIX, after printing has been accomplished at the nip between the blanket cylinders the gripper bars 8 strip the paper from the surfaces of the inked blanket cylinders 48U and 48L, causing the sheet 5 to bisect the cusp C, and carries and directs the sheets to the next printing tower.

From the foregoing it should be apparent that I have developed a novel sheet transfer mechanism which utilizes natural phenomena for aerodynamically supporting a sheet to and through successive printing towers wherein the sheet travels along the line of least resistance.

In view of the fact that sheets 5 are continuously gripped by spaced grippers 210 mounted on a single gripper the sheet bar 8 from the moment the sheet leaves feeder mechanism 2 until the moment it is released at delivery mechanism 22, I anticipate the use of the above described sheet transfer mechanism with a feeder which feeds two sheets of paper simultaneously whereby the two sheets may be gripped and carried through the successive printing towers wherein printing will be accomplished on one side of each sheet simultaneously or printing may be accomplished on both sides of a single sheet simultaneously. Operation of the sheet transfer mechanism in this manner will allow the printer who does not wish to print on both sides of the hseet to run two sheets simultaneously through the perfecting printing towers, thereby utilizing the perfecting advantage while printing on one side of the sheet, thereby doubling production for a job requiring the printing on one side of a sheet.

The above description of a sheet transfer mechanism and the mechanism for individually driving printing towers 18 and 20 has been limited to printing towers capable of printing on both sides of a sheet simultaneously. It should be noted, however, that the above description is intended only to illustrate one suitable embodiment of the invention. Obviously, the use of perfecting printing towers is not a prerequisite to success of the sheet transfer mechanism 10 or the drive mechanism which I have developed.

The perfecting printing towers, which have been described and illustrated in the drawing, may be utilized for printing on one side of a sheet, if it is desirable to do so, by simply removing the plate 40 from one of the plate cylinders 38.

Individual printing towers 18 and 20 may be adapted to print on one side of a sheet by merely eliminating one of the plate cylinders 38 and substituting an impression cylinder for one of the blanket cylinders.

The straight through and continuous sheet transfer concept of offset printing hereinbefore described does not require that the sheet remain in a plane perpendicular to a line between the centers of the printing cylinders. Likewise, it is not necessary that the center of opposing blanket cylinders be vertically one above the other. The term "straight through" merely distinguishes the concept of the present invention from a sheet transfer mechanism of conventional printing presses wherein a sheet is fed serpentine fashion through the press.

Although multiple printing towers have been shown and described, the concept of the present invention may be utilized with a press having a single station for printing on one side or on both sides of a sheet.

PRIMARY INKER

Primary inker 32, best seen in FIGS. V, XXII and XXV, includes an ink reservoir 232 which forms a receptacle for ink 234. The ink reservoir 232 is defined by a plate 236 extending between side plates 237. Plate 236 is detachably secured to a substantially semi-circular shaft 238 which is rotatably journaled adjacent its opposite ends in adjustment eccentric 240 in self-aligning bushing 240a carried in bracket 240b, secured by bolts 240c to mounting plate 33, detachably secured to side frames 26 and 28. A doctor blade 239 is bolted, or otherwise detachably secured, on the shaft 238 adjacent a lower edge of the plate 236.

Adjustment 242, consisting of a screw **242*a*, having right-hand threads at one end thereof and lefthand threads at the other end thereof, threadedly engages rod eyes 242*b* at each end thereof. One rod eye 242*b* is pivotally connected to shaft 238 by pin 242*c*, while the other rod eye 242*b* is pivotally connected to the mounting plate 33 by pin 242*d***.

A resilient surfaced ink transfer roller 244 is rotatably journaled in bushings 250 extending through side frames 26 and 28 in a position adjacent the ink reservoir 232 and defines one side thereof. Doctor blade 239 extends outwardly from the surface of shaft 238 whereby the radius from the center of the shaft 238 to the edge **239*a* of the doctor blade 239 is greater than the radius of the shaft 238. It should be readily apparent in FIG. XXII of the drawing that the adjustment screw 242 may be rotated for adjusting the pressure between the edge 239*a* of the doctor blade 239 and the surface of the ink transfer roller 244**.

As ink transfer roller 244 rotates through the ink 234 downwardly toward the doctor blade 239 a metered film of ink **244*a* adheres to the surface thereof. The function of the adjustable doctor blade is to meter or regulate the ink film thickness. Therefore, the doctor blade 239 is a coarse metering device for measuring ink distribution to the transfer roller 244**.

Eccentric 240 is a means for adjusting the distance between the center of shaft 238 and the center of ink transfer roller 244; and, therefore, is also a means for adjusting the pressure between the edge **239*a* of doctor blade 239 and the surface of transfer roller 244. Uneven adjustment of eccentrics 240 at opposite edns of shaft 238 adjusts the thickness of ink film 244*a* laterally along the length of roller 244. After lateral distribution has been attained, adjustment screw 242 is utilized to vary the thickness of film 244*a*** while leaving lateral distribution undisturbed.

Applicator roller 246 is in rolling pressure contact with transfer roller 244. Consequently, the ink film **244*a* will be split, according to the theory commonly referred to as the equal split theory. whereby ink film 244*b* on the ink transfer roller 244 and the ink film 246*a* on the applicator roller 246** will be substantially the same thickness.

Applicator roller 246 is also in rolling contact with the raised ink pad 44 on the plate cylinder 38, thereby resulting in a split of the ink film **246*a* into film 246*b* on the applicator roller 246 and a film 44*a* on the ink pad 44. It should be noted, as heretofore pointed out in the description of the plate cylinder 38, that applicator roller 246 applies ink to the raised ink pad 44; however, plate 40 which is not raised does not contact applicator roller 246. Consequently the primary inker 32 is in contact with and applies ink only to the raised ink pad 44 and not to the plate 40**.

The applicator roller 246 and transfer roller 244 are geared together, as will be hereinafter explained and consequently rotate at the same speed while the gearing is such that plate cylinder 38 may rotate at a different speed. By increasing or decreasing speed of rotation of the applicator roller 246, the thickness of the ink film **44*a* may be varied. The thickness of the ink film 44*a*, therefore, regulated through a coarse adjustment by varying the pressure of doctor blade 239 on the transfer roller 244 while fine regulation is achieved by varying the surface speed of the applicator roller 246 relative to the surface speed of ink pad 44**.

As best seen in FIG. XXV, ink transfer roller 244 is rigidly mounted on shaft 248 which is journaled in bushing 250 in the side frames 26 and 28 of each printing tower 18 and 20. Shaft 248 extends through the operator-side side frame 26 and has a gear 252 rigidly connected thereto which meshes with and is driven by gear 254 rigidly secured to the shaft 256 of a variable ratio gear box 258 which is driven by conventional power take-off means synchronized to press speed.

From the foregoing it should be apparent that while speed of transfer roller 244 is variable, once a desired ratio of speed of the transfer roller 244 relative to the speed of the plate cylinder has been established, thereby regulating the ink film **44*a* at a desired thickness, changes in the speed of the plate cylinder 38 will result in a corresponding change in the speed of the ink transfer roller 244 and applicator roller 246, thereby maintaining a desired thickness of the ink film 44*a***.

A hanger 260 is pivotally mounted on bushing 250 and supports an eccentric bushing 262 in the opposite end thereof, having a shaft 264 on which the applicator roller 246 is mounted. Hanger 260 is rotated by an actuating cylinder 261 against a positive adjustable stop **261*a*, thereby controlling contacting pressure between the ink pad and applicator roller 246. Timing gears 265 and 266 are mounted on shafts 248 and 264 respectively whereby rotation of the applicator roller 246 is imparted by rotation of the transfer roller 244**.

The particular modification of the primary inker allows the transfer roller 244 and the applicator roller 246 to rotate in a driving relationship at substantially the same surface speed, having a speed determined by the variable ratio drive gear box 258. This allows applicator roller 246 to slip relative to ink pad 44, furnishing a fine metering device for precisely regulating the thickness of the ink film **44*a***.

If it is deemed more desirable to do so, timing gear 265 may be placed on the plate cylinder 38 thereby causing the applicator roller 246 and the plate cylinder 38 to rotate in a driving relationship. This also allows a fine regulation of the film thickness **44*a* by slipping transfer roller 244 relative to applicator roller 246**. In this case the applicator merely serves as an idler.

Although the transfer roller is shown and described with applicator roller between it and the plate cylinder 38, it should be understood that if the primary inker were placed on the other side of the plate cylinder, am applicator roller 246 would be unnecessary and transfer roller 244 would directly contact the raised ink pad 44.

Utilization of the ink pad 44, the surface of which is raised above the plate surface 40, eliminates the requirement for oscillating the applicator roller away from the plate as plate approaches this roller. Oscillation would necessarily be required if ink pad and plate were on the same level so that only the applicator roller contacts the ink pad surface.

Instances in which it is not deemed expedient to utilize the raised ink pad, ink pad 44 may be lowered thereby causing the outer surface of the ink pad to be the same radial distance from the center of plate cylinder 38 as the radial distance from the center of the plate cylinder to the outer surface of the plate 40. If the ink pad 44 is not raised, applicator roller 246 may be mounted on a shaft 272, thereby then acting as an oscillating roller, as shown in the modified form of FIG. XXVI. A rotatable cam 276, geared to the press drive, is provided for alternately shifiting the applicator roller 246 between the transfer roller 244 and the ink pad 44. Bell crank 270 carries a cam follower 274 on the lower end thereof and such follower is spring urged into contact with the surface of a cam 276 by spring 278. It will be apparent that as the larger radius **176*a* of the cam 276 contacts the cam follower 274 the applicator roller 246 will be pushed into pressure contact with the ink pad 44 and that when the cam follower 274 engages the reduced radius 276*b* of the cam 276, the spring 278 will push the applicator roller 246 into contact with the transfer roller 244. Thereby the applicator roller 246 alternately contacts the ink pad 44 and the transfer roller 244 to transfer ink from the transfer roller 244 to the ink pad 44**.

The applicator roller 246 is in pressure contact with transfer roller 244 when the plate 40 is in a position adjacent applicator roller 246. As the ink pad 44 is rotated adjacent applicator roller 246, the said roller will oscillate onto the ink pad 44 to replenish ink thereto.

The purpose of the ink pad 44 is to facilitate even distribution of the ink film over form rollers of the secondary inker and to allow time for recovery of the ink film on the forms after they have been partially depleted of ink by the passing of the plate 40 thereover. The ink pad acts as a ductor which is partially depleted of ink by the passing of the forms, the ink being replenished by the primary inker. The use of conventional keys on the rigid doctor blade 239 is not necessary under normal operating conditions. However, it may be deemed expedient, without deterring from the plate cylinder and secondary inker arrangement, to utilize conventional keys or adjusting screws 280 which are positioned in spaced apart relation along the length of a conventional ink fountain doctor blade 282 for varying the pressure at particular locations along the length of the blade with respect to transfer roller 244. Such a result may be accomplished utilizing a conventional blade support assembly of the type shown in FIG. XXVI for distributing ink over ink pad 44.

SECONDARY INKER

Referring to FIGS. V, XXII, XXIII and XXIV of the drawing, the secondary inker, generally designated by numeral 34, includes a plurality of form rollers 290, 292, 294 and 296 rotatably journaled in eccentric 300 adjustably secured to form roll hangers **290*a*, 292*a*, 294*a* and 296*a*. Cap screws 300*a*, extending through a threaded opening in an outwardly extending portion of each form roll hanger 290*a*, 292*a*, 294*a* and 296*a*, may be loosened, allowing rotation of the eccentrics 300 by inserting a pin wrench into holes 300*b* in each eccentric bearing 300, thereby adjusting pressure between each form roller 290 through 296 and vibrator rollers 306 and 310. Eccentric bushings 262 in the primary inker are similar in construction to bearings 300** in the secondary inker.

Ink is fed to the ink pad 44, as hereinbefore described, by the primary inker 32. The ink film **44*a* on the ink pad 44 is distributed over form rollers 290 through 296, each having a resilient ink receptive surface. The vibrator rollers 306, 308 and 310, usually metal, and having a smooth ink receptive surface, impart a smooth, churning action to the ink film on the said form rollers to minimize irregularities that may form in the ink film thereon. The ink film transferred from the pad 44 to the forms must go through this experience prior to being applied to the plate 40**. Vibrator rollers serve not only to laterally smooth ink films on the form rolls but also serve as momentary storage rolls replenishing form rolls of ink removed therefrom until the ink storage pad can fully recharge the form roll at the beginning of the inking cycle. They also serve to drive form rollers at press speed, especially when forms are in plate gap areas.

Vibrator rollers 306 and 310 are mounted on shafts 312 and 314 respectively and when rotated are translated axially by conventional vibrator boxes 316 which use a worm, worm gear and cam linked to the inker or press frame for providing translating motion.

Each form roll 290 through 296 is rotatably journaled on separate form roll hangers **290*a*, 292*a*, 294*a* and 296*a* respectively which are rotatably journaled on sleeves 311 and 313 around the shafts 312 and 314 of vibrator rollers 306 and 310. Each form roll hanger 292*a*–296*a* is adjustably secured to actuator plate 304 by bolt 298*b* in an elongated slot 298*c* whereby pressure between each form roller and the plate cylinder 38 may be adjusted. To vary the pressure, bolt 298*b* may be loosened whereby the form roller hangers 292*a*–296*a* may be pivoted by turning adjusting screws 298*d* rigidly secured to the actuator plate 304 and block 298*e*. From FIG. XXII of the drawing, it is apparent that tightening adjustment screw 298*d* will rotate form roller hanger 292*a*–296*a* and consequently the form roller toward plate cylinder 38. When proper pressure is achieved, bolt 298*b*** may be tightened, locking the form roller in the desired position.

Actuator plate 304 is pivotally mounted and rotates about shaft 312. Actuator cylinder 318 may be utilized for throwing the secondary inker 34 on or off. In FIG. XXII of the drawing it should be apparent that retraction of the piston rod of cylinder 318 will rotate actuator plate 304, causing form rollers 292, 294 and 296 to be separated from the surface of plate cylinder 38.

Multiple form rollers serve to smooth out the layer of ink to the plate 40 and multiple diameters serve to minimize any visible trace of one revolution pattern between the rollers and the plate.

Vibrator roller 306 is driven by timing belt 305 on the drive side of the press and timing belt 307 on the end of shaft 312, connected to vibrator roller 306, transmits motion to vibrator roller 310. Roller 308 is a self-actuating vibrator and serves to connect roller 292 to 294. Gearing is selected so that all rolls of the secondary inker travel at substantially the same surface speed as the plate surface.

From the foregoing it should be readily apparent that I have developed a new and novel inking system comprising a primary inker which delivers a regulated ink film **44*a* to ink pad 44 of plate cylinder 38, which in turn is transmitted to form rollers 290–296 and subsequently to plate 40 attached to plate cylinder 38**. Because the length of the ink pad is made equal to, or greater than, the circumference of the largest form roll, all form rolls turn at least one revolution on the pad and become fully replenished of ink after contact with the plate.

DAMPENER

Dampener 36 includes a reservoir 330 for dampening fluid having a resilient covered metering roll 332 rotatably submerged therein which is in rolling pressure contact with a chrome-plated hydrophilic transfer roll 334 which is also in rolling pressure contact with form roll 290 for providing dampening fluid thereto. Dampener 36 is preferably of the type disclosed in my U.S. Pat. No. 3,168,037, issued Feb. 2, 1965, entitled "Means for Dampening Lithographic Offset Printing Plates".

Dampener actuator cylinder 336 is connected to the metering and transfer roller hanger 338 which is pivotally mounted at the centerline of metering roller 332. The form hanger **290*a* which supports form roll 290 is connected to the hanger 338, supporting chrome-plated transfer roller 334 by a turnbuckle 338. Referring to FIG. XXII, it should be apparent that actuation of cylinder 336 rotates hanger 338 and hanger 290*a*, thereby separating form roller 290 from plate cylinder 38. The link is so positioned that the transfer roller 334 also separates from form roller 290 as cylinder 336** is actuated.

The dampener drive is individually driven and controlled. The drive is variable speed with controls at each station and remote controls at a console or master station, and speed indication (which indicates) moisture transfer) and trim controls at the delivery end of the printing system. However, other types of conventional dampeners could be employed.

HYDROSTATIC BEARER

As hereinbefore pointed out in the description of the plate cylinders 38 and the blanket cylinders 48, the massive bearers which are universally used to prevent vibration of the plate cylinders and the blanket cylinders when the cutaway portions therein come into rolling contact have been eliminated. As best illustrated in FIGS. XI–XVI, XXIX and XXX of the drawing, a hydrostatic bearer bearing 46 is utilized for radially encompassing the shaft **38*a* at each end of each plate cylinder 38 and each blanket cylinder 48 in the side walls 26 and 28 of each printing tower 18 and 20**.

Each hydrostatic bearer bearing 46 comprises bushing **27, 27*a*, 29 and 29*a* which may have inside and outside diameters either concentric or eccentric, depending upon which cylinder is journaled therein. Bushing 27*a* and 29*a*, in which the upper and lower blanket cylinders 48U and 48L** are journaled, are eccentric as hereinbefore described and are rotated by the throw-off mechanism.

Each bushing **27, 27*a*, 29 and 29*a* has a multiplicity of recessed areas 344 cut away from the inner surface thereof as best seen in FIGS. XIII–XVI. While any number and any configuration of recesses may be utilized which provides the best result for a specific situation, depending upon the size and loading of the cylinders, the particular embodiment illustrated in the drawing consists of four substantially rectangular indentions in the inner face of each bushing 27, 27*a*, 29 and 29*a* which are equally spaced and diametrically opposed. Each recessed area 344 has an inlet port 346 centrally located therein which communicates with a flexible branch line 348. Each branch line 348 has a pressure gauge 350 and a valve 352 mounted therein, whereby the pressure and flow rate of oil to each recessed area 344 may be closely regulated. Branch lines 348 communicate through a suitable connection 356 with a trunk line 358 which in turn communicates through a suitable connection 360 with a supply line 362. A pressure gauge 364 and valve 366 are positioned in supply line 362 for regulating pressure and flow rate of oil delivered by pump 368 from reservoir 370 through the supply line 362**.

A modified form of the hydrostatic bearer is illustrated in FIGS. XXIX and XXX wherein each bushing **27, 27*a*, 29 and 29*a* has a smooth bore 372*d* formed in the outer end thereof. Each bore 372*d* has a shoulder 372*e* at the inner end thereof against which a sleeve 372*f* is positioned in abutting relation. Spaced recessed areas 344' extend through walls of sleeve 372*f* and are positionable relative to fluid inlet ports 346*p* to permit circulation of fluid as hereinbefore described toward outlet ports 374*p***.

Provision of sleeves **372*f* allows fabrication of bushings 27, 27*a*, 29 and 29*a*** in segments which can be modified or replaced without replacing the entire assembly.

Sleeves **372*f*** are secured in position by any suitable means. However, in the preferred form the sleeve is secured by a shrink fit.

From the foregoing it should be readily apparent that the pump 368 provides oil or other suitable hydraulic fluid under pressure in regulated quantities through supply line 362 to trunk line 358 through the flexible branch line 348 to inlet port 346 of the recesses 344.

Seals 372 are positioned in spaced apart relation in annular grooves **372*a*, whereby oil delivered to recesses 344 is captured therebetween. Outlet ports 374 are positioned in communication with annular grooves 372*a* for removing low pressure oil from each bushing through return line 376 communicating therewith. A heat exchanger 378 is provided in return line 376 for cooling the oil which has been circulated through each bearing 27, 27*a*, 29 and 29*a*. Oil from heat exchanger 378 is returned to reservoir 370**, thereby completing the cycle through the hydraulic system.

Additional check valves, pressure gauges, filters and the like may be provided to solve problems encountered in specific situations.

Inlet port 346 and outlet port 374 may be positioned in any suitable configuration depending upon space requirements.

In view of the fact that the loading on the plate cylinders and blanket cylinders in small compared to pressure maintained in the vicinity of recesses 344, the hydrostatic bearer, hereinbefore described, provides a very stiff bearing which is virtually free from wear, having a starting torque which is negligible. Virtually friction free rotation may be achieved, although the difference in the outside diameter of the journal of the shaft and the inside diameter of each bushing 46 is very slight, having clearances of a few thousandths of an inch which results in a cylinder without wobble and having sufficient stiffness to eliminate bearers heretofore employed.

Bushings 27, **27*a*, 29 and 29*a* are very short in length relative to the distance between side frames 26 and 28 relative to the journal diameter of the cylinder ends. Therefore, exact alignment of said bushings in opposite side frames is not necessary to prevent binding between the journal and the bushing. Also closer fit of bearing to journal can be accomplished, thereby increasing stiffness, when narrow bearings are used because deflection of journals 38*a*, 38*b*, 48*a* and 48*b***, when loaded, is negligible.

By utilizing large rigid journals on the ends of the printing cylinders, by minimizing long widths, by using materials for both journal and bearing having nearly equal thermal expansion coefficients, and by preloading the journal in the center of the bearing with a controlled pressure, oil flow rate, and temperature, I have achieved virtually the ultimate in obtaining a very stiff, long life, low starting torque self-aligning, totally enclosed bearing which serves also as a hydro-bearer. I have disproved that the rule of thumb used by the industry for determining bearing clearances (0.001 inches/inch diameter) can be reduced substantially to one-fourth (0.00025 inches/inch diameter) without causing any adverse affects whatsoever.

I have eliminated not only bearers, but also problems relating thereto, such as setting bearer pressures and forcing conventional bearings and cylinder journals into an abnormal position which contributes to cylinder fatigue, short bearing life and costly maintenance.

Utilization of material having equal coefficients of thermal expansion, such as cast iron for bushings 27, **27*a*, 29 and 29*a* and steel for journals 38*a*, 38*b*, 48*a* and 48*b***, results in expansion of the hole in said bushings at the same rate of expansion as the journals, thereby resulting in uniformity of allowance between journal and bushing regardless of temperature increase or decrease of the members.

The use of the hydrostatic bearers is especially important in the press described herein, because it is important that wobble and drag be educed to a minimum in order to effect perfect registry, controlled cutoff and inter-unit synchronization provided by this improved press.

From the foregoing it should be readily apparent that I have developed a revolutionary printing press which is simple is design and operation and offers the ultimate in production while simultaneously achieving the ultimate in quality. I have developed a multi-color perfecting capability which includes a new combination of improved components comprising a hydrostatic bearer bearing, a load sharing and inter-unit synchronizing system plus a new and improved ink fountain, a novel plate cylinder and blanket cylinder having a cooperative relationship for providing a uniform distribution of the ink film for replenishing the ink, after each printing cycle, in accordance with demands of the blanket cylinder where printing is accomplished. A novel sheet transfer mechanism incorporated herein eliminates numerous printing problems heretofore encountered, while providing a sheet-fed printing press having all the advantages of the sheet-fed press and a web-fed press in a single unit which most effectively utilizes the improved inker in the lithographic process.

The press is versatile in that it may be adapted for perfecting, single side printing, or two sheets may be printed simultaneously.

While any one of the improved components which I have developed may be used individually or in combination for improving printing presses heretofore developed, best results are accomplished by combining the aforesaid improvements in a single printing press of the type hereinbefore described.

OPERATION

Having described a suitable embodiment of my invention, a mode of operation is as follows:

The sequence of operation will be described in five steps comprising:

Step 1 - make ready,
Step 2 - primary inker "on",
Step 3 - dampener "on",
Step 4 - secondary inker form rollers "on", and
Step 5 - impression "on".

Make ready procedure is substantially the same as that required in the operation of conventional printing presses. Plates 40 must be installed on plate cylinders 38 and blankets 50 must be installed on blanket cylinders 48 with proper packing **38*p* and 48*p* under each plate 40 and each blanket 50**.

The reservoir of the primary inker 32 and dampener 36 must be filled.

Certain initial adjustments must be made. The pressure between metering roll 332, chrome transfer roll 334 and form roll 290 must be adjusted to regulate the supply of dampening fluid to the plate, providing uniformly distributed and regulated amounts of moisture to the plate. The approximate speed ratio between transfer roll 334 and form roll 290 must be established for regulating the proper dampening fluid film thickness to the plate.

The pressure between doctor blade 239 and transfer roller 244 of the primary inker 32 must be adjusted for regulating the thickness of film 244*a*. The approximate speed ratio between roller 246 and plate cylinder 38 must be established for regulating the thickness of ink film 44*a* on ink pad 44.

The pressure between form folls 290 and 292 and vibrator roller 306 and form rollers 294 and 296 with vibrator roller 310 may be adjusted for providing smooth distribution of ink film 44*a* over said form rollers. Form rolls 290–296 and applicator roll 26 should be properly set to plate and ink pad respectively.

Printing impression pressure may be adjusted by varying the pressure between each blanket cylinder 48 and its adjacent plate cylinder 38, utilizing adjustment screw 82.

Sheet pressure may be adjusted for the specific thickness of stock to be run, utilizing paper pressure adjustment 84.

A stack of sheets 4 is placed upon the skid of feeder mechanism 2. Make ready is completed by starting the printing units, thereby starting the sheet transfer mechanism 10 synchronized through links 136 and 138 with the individual printing towers 18 and 20, thereby starting feeder 2 and delivery 22. When the printing units are started all cylinders, the plate cylinders 38 and blanket cylinders 48, all form rolls, all vibrator rollers and the sheet transfer mechanism are traveling at virtually the same surface speed. When the inker and dampener reservoirs are full and the rollers are rotating, step 1, make ready, is completed.

Step 2 of the operation, primary inker "on", is initiated by actuating cylinder 261, causing roller 246 to be pivoted in contact with ink pads 44 on plate cylinders 38. Ink film 44*a* builds up to an equilibrium thickness according to the adjustment of ink fountain doctor blade 239 and according to the speed of transfer roller 246 relative to the speed of plate cylinder 38.

It should be noted that ink pad 44 is slightly raised relative to plate 40 and consequently the primary inking transfer roller 246 contacts only the ink receptive storage pad 44 while clearing the plate 40 as the respective cylinders rotate. Therefore, the plate 40 does not receive ink from the primary inker 32.

Step 3, dampener and first form roller of secondary inker "on", is initiated by actuating cylinder 336, cuasing form rolls 290 to be pivoted into contact with plates 40 on plate cylinders 38. The fountain solution is now being distributed to the first inker form rollers 290 and thence to the plate 40 and builds up an equilibrium on the plate 40 according to the dampening metering roll setting to the transfer roll and according to transfer roll's surface speed relative to that of form roll 290.

It should be noted that form roll 290 contacts the ink pad 44 as well as dampener transfer roll 334 and plate 40, thereby starting the supply of ink to the remaining secondary inker rollers 292, 294, and 296 and to the plate 40. Fountain solution and ink is now on the plate where lithography occurs. Plate 40 is cleaned in the non-image areas and inked up in image areas. The remaining form rolls of the secondary inker 34 are now ready to engage plate 40.

Step 4 of the operating sequence, secondary inker forms "on", is initiated by actuating cylinder 318, causing form rollers 292, 294 and 296 to be pivoted into contact with plate 40. Each form roll 290–296 turns at least one complete revolution on the ink pad 44 prior to engagement with plate 40.

Multiple form rolls serve to smooth out the layer of ink to the plate and multiple diameters serve to minimize any visible trace of one revolution pattern between the rollers and the plate. Vibrators 306, 308 and 310 serve to laterally smooth ink films on the form rolls and serve as momentary storage rolls, replenishing the form rolls of ink removed therefrom until the ink storage pad 44 can fully recharge the form roll at the beginning of the inking cycle.

As hereinbefore explained, form rolls 292–296 are disengaged from plate 40 and ink storage pad 44 when the secondary inker is off. When the secondary inker forms are on they engage plate 40 and ink storage pad 44. When the individual printing tower is off impression, the blanket and plate cylinders are separated and the blanket cylinders are separated. After a few revolutions of the plate an equilibrium of ink and water is reached, keeping the non-image area clean and maintaining a fixed quantity of ink on the plate ready for transfer to the blanket 50 when the tower is placed on impression for the printing cycle.

Step 5 of the cycle of operation is impression "on". A sheet from stack 4 in feeder station 2 will be started through the press manually. Blanket cylinders 48 go on automatically and progressively when a sheet is detected at the proper place prior to entering the first printing station. Absence of a sheet at a proper place will stop the feeders and sequentially and progressively throw off the blanket cylinders at each printing station as the last sheet to be printed progresses through the system.

The first sheet 5 is detected by an electrical limit switch (not shown). The electrical limit switch actuates throw-off cylinder 60 simultaneously moving the upper blanket cylinder 48U and the lower blanket cylinder 48L into contact with plates 40 on the upper and lower plate cylinders 38U and 38L and into contact with sheet 5 as it moves between the blanket cylinders 48U and 48L. As the sheet progresses to subsequent printing towers, the blanket cylinders will be engaged in precise synchronization so that the blanket cylinders are engaged to opposing blankets and their adjacent plate cylinders at the proper time.

Absence of a sheet in its proper place prior to entering the first printing station will cause the first printing station opposing blanket cylinders to separate immediately after the last sheet leaves the blanket nip 50*n*. Through synchronization, the following printing stations blanket cylinders separate as this same last sheet leaves the blanket cylinder nip of the respective towers. All units will remain off until the feeding problem is corrected and the feeder is manually started.

After the presence or absence of a sheet is detected the method of blanket cylinder actuation is performed by electrical limit switches, operating by cams synchronized with the system, which operate selector valves, which in turn route oil or air pressure to hydraulic or pneumatic cylinders 60. The cylinders operate a mechanical linkage, hereinbefore described, which engages the blanket cylinders when a sheet 5 is present or disengages the blanket cylinders when a sheet is not present.

As blanket 50 is moved into contact with plate 40 and sheet 5, ink is transferred from plate 40 to blanket 50 and offset to sheet 5. The cycle of inking, dampening and printing with a continuous duty inker and dampener now begins.

After an equilibrium of ink and water is reached on the plate 40 and, therefore, throughout the inking and dampening system, it should be noted that upon going "on impression" any ink or water quantity removed from the plate 40, caused by transfer to the blanket 50 and thence to the sheet 5, is immediately replenished by the continuous duty aspects of the inking and dampening system.

It should also be noted that ink removed from blanket 50 by the sheet 5 is replenished by plate 40 while plate 40 is replenished by form rools 290–296 of the secondary inker 34. Ink or water removed from forms 290–296 is replenished by the continuous duty dampening system 36, ink vibrator storage rolls 306, 308 and 310 and ink storage pad 44. Ink removed from storage pad 44 is replenished by the continuous primary inker 32.

Form rolls 290–296 of secondary inker 34 are replenished by the ink pad 44, presenting a fully recovered ink surface to the plate 40 after it has been depleted of ink by blanket 50. With each cycle of plate cylinder 38, exactly the same amount of ink which is removed from form rolls 290–296 is replenished.

Minute adjustments may be made at the beginning or during the production run.

As the last sheet from stack 4 leaves feeder station 2 the electrical limit switch will actuate throwoff cylinder 60, causing the blanket cylinders of the first printing station to separate immediately after the last sheet leaves the blanket nip. Subsequent printing towers will be thrown off impression as the last sheet passes therethrough.

As many towers may be added as may be desired, the two illustrated being simply for illustration purposes. Therefore, as many colors may be printed on one or both sides of the sheet as may be desired, depending upon the number of towers.

Furthermore, any tower or the upper or lower section of any tower may be rendered inoperative for printing simply by leaving the plate off of the selected plate cylinder, in which instance the blanket cylinder associated therewith would serve as an impression cylinder only. Therefore the press may be selectively utilized for printing on one or both sides of the sheet. Perfect registry and cutoff is accomplished by virtue of the continuous sheet conveyor system hereinbefore described.

It will be understood that other and further embodiments of the invention may be devised without departing from the spirit and scope of the appended claims.

Having described my invention, I claim:

1. In a sheet-fed lithographic offset printing press, a feeder station; a delivery station; at least one cylinder support, including spaced side members intermediate the feeder and delivery stations; a plate cylinder journaled between the side members, said plate cylinder having a longitudinally extending gap; a blanket cylinder journaled between the side members, said blanket cylinder having a longitudinally extending gap; an impression cylinder journaled between the side members adjacent the blanket cylinder; means to urge said plate cylinder and said blanket cylinder into rolling pressure relation; means to urge said blanket cylinder and impression cylinder into pressure relation; means for applying ink to the plate cylinder; gripper members adapted to receive and grip an edge of a sheet at the feeder station and continuously convey a sheet between the surfaces of the blanket cylinder and the impression cylinder to the delivery station; continuous transfer means movably extending from the feeder station to the delivery station; means securing said gripper members to said transfer means; means to rotate said plate cylinder, blanket cylinder and impression cylinder; hollow bushings about ends of the plate cylinder, the blanket cylinder, and the impression cylinder, each of said bushings having a plurality of pressure recesses spaced about the inner side; an inlet communicating with each pressure recess; a source of pressurized fluid; and lines connecting said source and said inlets whereby fluid may be supplied to each pressure recess at predetermined pressure, said recesses being arranged such that force exerted by fluid pressure maintains axes of the plate cylinder, the blanket cylinder and impression cylinder in a fixed relationship as said cylinders rotate.

* * * * *